United States Patent
Benyamin et al.

(10) Patent No.: US 6,531,931 B1
(45) Date of Patent: Mar. 11, 2003

(54) CIRCUIT AND METHOD FOR EQUALIZATION OF SIGNALS RECEIVED OVER A COMMUNICATION SYSTEM TRANSMISSION LINE

(75) Inventors: Saied Benyamin, San Jose, CA (US); Michael Arthur Brown, San Jose, CA (US); Ramin Shirani, Morgan Hill, CA (US)

(73) Assignee: Agere Systems Inc., Allentown, PA (US)

(*) Notice: Subject to any disclaimer, the term of this patent is extended or adjusted under 35 U.S.C. 154(b) by 0 days.

(21) Appl. No.: 09/321,901

(22) Filed: May 28, 1999

Related U.S. Application Data

(60) Provisional application No. 60/087,605, filed on Jun. 1, 1998.

(51) Int. Cl.[7] .................... H03H 11/06; H03G 5/16
(52) U.S. Cl. .................. 333/18; 333/28 R; 375/230; 330/304
(58) Field of Search ................ 33/28 R, 18; 375/229, 375/230; 330/304, 124 R

(56) References Cited

U.S. PATENT DOCUMENTS

| | | | | |
|---|---|---|---|---|
| 5,115,213 A | * | 5/1992 | Eguchi | 333/18 |
| 5,337,025 A | * | 8/1994 | Polhemus | 333/28 R |

* cited by examiner

*Primary Examiner*—Benny Lee
*Assistant Examiner*—Stephen E. Jones
(74) *Attorney, Agent, or Firm*—Steve Mendelsohn; Ian M. Hughes

(57) ABSTRACT

A circuit and method for equalization of a communication signal received over a communication system transmission line using switched filter characteristics. Equalization for frequency-independent and frequency-dependent attenuation of the communication signal is accomplished with a linear equalization channel which includes an input biasing circuit which provides a common input signal to two parallel amplifier paths. One path includes a wideband, fixed-gain, frequency-independent amplifier stage. The other path is a wideband multiplier amplifier stage in series with a wideband, frequency-dependent amplifier stage having a switchable high-pass characteristic. The outputs of the fixed-gain wideband frequency-independent amplifier stage and wideband, frequency-dependent amplifier stage having a switchable high-pass characteristic are both tied in common to the input of a wideband gain buffer amplifier stage, which has a switchable high-frequency boost frequency response characteristic. Filter characteristic for the frequency-dependent amplifier stages are selected to accommodate predetermined ranges of cable lengths. The amplifier stages are formed as simple n-MOS transconductance differential amplifiers with restive loads and with switchable filter components connected between the legs of the differential amplifiers.

20 Claims, 20 Drawing Sheets

|  | MODE 1 | MODE 2 | MODE 3 | MODE 4 |
|---|---|---|---|---|
| GAIN ALTENUATOR(ON LINE 411) | 1 | 0 | 0 | 0 |
| GAIN MAX FACTOR | 1.9 | 1.4 | 1.4 | 1.4 |
| GAIN MAX IN db | 1.51 | 2.9 | 2.9 | 2.9 |
| FILTER SELECT(ON LINE 415) | 0 | 0 | 1 | 1 |
| DC GAIN | −26 | −26 | −22 | −22 |
| # OF POLES/ZEROES IN FILTER | 3 | 3 | 2 | 2 |
| BOOST SELECT(ON LINE 409) | 0 | 0 | 0 | 1 |
| GAIN BUFFER DC GAIN | 7.6 | 7.6 | 7.6 | 7.6 |
| # OF POLES/ZEROES IN GAIN BUFFER | 0 | 0 | 0 | 2 |
| DRAWING FIG. # | 14 | 16 | 18 |  |
| LOW ALPHA | 0.1 | 0.1 | 0.4 |  |
| DRAWING FIG. # | 15 | 17 | 19 | 20 |
| CABLE LENGTHS | 9,75 | 10,85 | 80,140 | 140,160 |
| V CONTROL STARTS AT | 0 | 0 | LOW | MAX |
| MAX CABLE LENGTH IN METER | 70 | 90 | 140 | 170 |

*FIG. 21*

CIRCUIT AND METHOD FOR EQUALIZATION OF SIGNALS RECEIVED OVER A COMMUNICATION SYSTEM TRANSMISSION LINE

CROSS-REFERENCES TO RELATED APPLICATIONS

This application claims the benefit of U.S. Provisional Patent Application Ser. No. 60/087,605, filed Jun. 1, 1998.

This application incorporates by reference the following U.S. patent applications that have been assigned to Enable Semiconductor, Inc., a California corporation: Ser. No. 09/061,937, filed Apr. 17, 1998, now U.S. Pat. No. 6,188,721, titled "System and Method for Adaptive Equalization of a Waveform Independent of Absolute Waveform Peak Value," by Shirani et al.; and Ser. No. 09/062,342, now U.S. Pat. No. 6,148,025, filed Apr. 17, 1998, titled "System and Method for Compensating for Baseline Wander," by Shirani et al.

BACKGROUND OF THE INVENTION

1. Technical Field

The present invention relates generally to receivers connected to transmission lines and more specifically to a receiver circuit for compensating for signal loss caused by a transmission line.

2. Prior Art

Coaxial cables exhibit a skin effect which attenuates transmitted signals based on their frequency. The amount of attenuation in decibels (db) increases in proportion to the square root of the frequency f of the transmitted signal. Additionally, the coaxial cable length and diameter, the ambient temperature, and other factors affect attenuation of signals.

Equalization amplifiers are used to compensate for signal attenuation. Ideally, the equalization amplifier transfer function is the inverse of the transfer function representing the degree of signal attenuation in the transmission line. This enables recovery of data signal components (e.g., high frequency components) which have been attenuated by the transmission line.

Conventional equalization circuits are described in U.S. Pat. No. 5,115,213 to T. Eguchi; U.S. Pat. No. 4,187,479 to K. Ishizuka; U.S. Pat. No. 4,689,805 to S. Pyhalammi et al.; U.S. Pat. No. 5,036,525 to H. Wong; U.S. Pat. No. 4,275,358 to W. A. Winget; U.S. Pat. No. 4,378,535 to R. F. Chiu et al.; U.S. Pat. No. 4,768,205 to K. Nakayama; U.S. Pat. No. 5,337,025 to G. D. Polhemus; U.S. Pat. No. 5,293,405 to J. E. Gersbach et al.; U.S. Pat. No. 4,459,698 to O. Yumoto et al.; U.S. Pat. No. 4,583,235 to J. Domer et al.; U.S. Pat. No. 4,243,956 to M. Lemoussu et al.; U.S. Pat. No. 4,961,057 to S. Ibukuro; and in Giacoletto, L. J. (editor), Electronics Designersí Handbook (2nd ed.), McGraw-Hill Book Company, New York, N.Y. (1977).

A conventional equalization linear channel provides a single filter having a fixed transfer function which provides optimal equalization for a limited range of cable lengths. A filter whose transfer function is optimized for shorter cables will not be as optimal for longer cables. Similarly, a filter whose transfer function is optimized for long cables will not be as optimal for shorter cables.

Typically, an equalization linear channel, for short cables can be coupled in series with another short cable equalization linear channel to provide equalization for a longer cable. However, equalization imperfections occurring in the first stage are magnified by the second stage, resulting in non-optimal performance for a long cable. Also, each equalization stage consists of several amplifiers so coupling equalization stages in series puts numerous amplifier stages in series. Each amplifier stage loses some of the signal bandwidth, particularly at high frequencies, which reduces the bandwidth of the entire linear channel, thereby reducing the signal-to-noise ratio and the optimization for long cable equalization.

The problem of amplifier bandwidth loss is aggravated in amplifiers built using commercially available Complementary-Metal Oxide Semiconductor (CMOS) processes due to the lower tranconductances and higher offsets of Metal Oxide Semiconductor (MOS) devices compared to bipolar devices. The gain bandwidth product of CMOS amplifier structures is typically lower than that of bipolar amplifier structures.

A transmission cable typically has a frequency independent (or DC) loss which is a linear function of the cable length. An equalization architecture should restore the DC component lost in the cable and output a signal having an amplitude close to that of the originally transmitted signal. An adaptive equalization algorithm which is peak-dependent demands that the equalized output signal peak be very close to that of the originally transmitted signal before cable attenuation. Algorithms which are peak-independent are preferable but it remains important to restore as much as possible of the lost DC component to maximize the signal-to-noise ratio.

Conventional adaptive equalization systems also suffer from a problem known as "baseline wander" which occurs when using differential signal transmission (i.e., MLT-3 coding) over a twisted pair medium. MLT-3 coding systems use three voltage levels (i.e., +1V, 0V, and −1V) relative to a return voltage, referred to as the baseline or baseline reference which is typically set to ground. In practice, the baseline does not remain at ground, but instead wanders up and down, which is referred to as "baseline wander."

What is needed is an equalization linear channel architecture which can be implemented in a commercially available CMOS process, which can provide optimum filter transfer characteristics over a wide range of cable lengths and which has sufficient bandwidth over a wide frequency range even when operating with a low (3 volt) supply voltage. This architecture should also restore most of the originally transmitted signal amplitude in order to maximize the signal-to-noise ratio.

SUMMARY OF THE INVENTION

The present invention provides equalization of signals received over a communication system transmission line. The invention includes an equalization linear channel having an input biasing stage, a linearity amplifier stage, a first DC gain stage, a second DC gain stage, a DC multiplier stage, an AC/DC gain stage, and a gain buffer stage.

The present invention is advantageous in that it provides an equalization linear channel which, over an exceptionally wide range of cable lengths, can optimally equalize waveforms to provide equalized waveforms close in amplitude to the transmitted waveforms independent of DC cable loss, thus maintaining a good signal-to-noise ratio. The circuit architecture comprises only a few amplifier stages in series and can be fabricated using well-known CMOS processes. The stages are transconductance amplifiers which are simple in construction, leading to a high bandwidth in each stage and improved immunity to both offset and power supply noise effects. The circuit architecture performs consistently over wide variations in temperature, power supply, and process, and can be implemented readily with either 3 volt or 5 volt power supplies. The 3 volt power supply architecture provides recognized power and system advantages over a 5 volt power supply.

These and other aspects of the invention will be appreciated by those skilled in the art upon review of the detailed description, drawings and claims set forth below.

BRIEF DESCRIPTION OF THE DRAWINGS

FIG. 21 is a table of values for the 4 modes of operation.

DETAILED DESCRIPTION OF THE INVENTION

Figure 1:
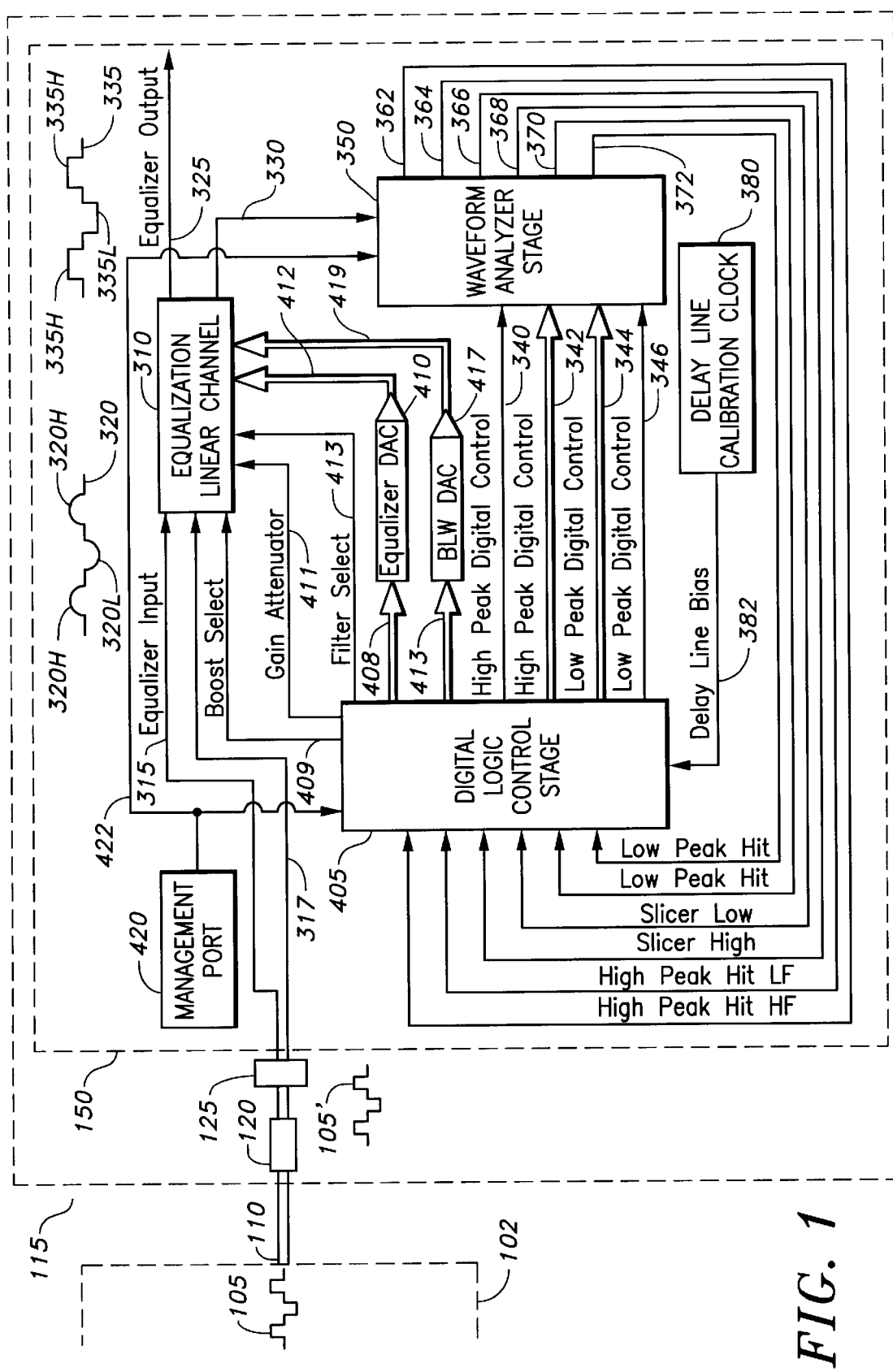
FIG. 1 is a block diagram of an adaptive equalization system.

FIG. 1 is a block diagram of an adaptive equalization system 150 used in a larger system 115. Within adaptive equalization system 150, equalization linear channel 310 receives differential data signals on input lines 315 and 317 and transmits an equalized differential data signal on output lines 325 and 330. Digital logic control stage 405 receives a control input signal on line 422 from management port 420, a delay line bias signal on line 382 from delay line calibration circuit 380, and High Peak Hit HF signal on line 362, High Peak Hit LF signal on line 364, Slicer High signal on line 366, Slicer Low 368, Low Peak Hit signal on line 370, and Low Peak Hit signal on line 372 from waveform analyzer stage 350. Digital logic control stage 405 provides input signals Boost Select on line 409, Gain Attenuator on line 411, Filter Select on line 415, an input signal on line 408 to equalizer DAC 410, an input signal on line 413 to Base Line Wander (BLW) DAC 417, and provides a High Peak Offset Control signal on line 340, High Peak Digital Control signal on line 342, Low Peak Digital Control signal on line 344 and Low Peak Offset Control signal on line 346 to waveform analyzer stage 350.

Equalization linear channel circuit 310 selectively amplifies the input signal 105 received over and attenuated by transmission line 110 from signal source 102. Transmission line 110 ranges in length typically from a few meters to over 140 meters. A signal propagating through transmission line 110 experiences attenuation or a line loss which varies in proportion to the square root of the frequency (f) and the length (L) of the transmission line, as expressed by equation (1):

$$\text{line-loss} = \exp[-(Af + Bf)/L] + \text{line-lossDC}(L) \qquad (1)$$

where A and B are constants and line-lossDC(L) is the DC loss of the signal propagating through transmission line 110. Line-lossDC(L) is substantially due to resistance in transmission line 110 and increases with L. Equation (1) can be approximated by equation (2):

$$\text{line-loss} = \exp[-Af/L] + \text{line-lossDC}(L) \qquad (2)$$

When connected to a transmission line of a known length and having a particular line-loss characteristic, equalization linear channel 310 generates and applies a gain versus frequency curve which compensates for the DC and frequency dependent attenuation experienced by signals traveling through the transmission line. Equalization linear channel 310 can generate a plurality of gain curves which can mirror the line-loss characteristics of many different transmission lines to equalize input signal 105. The shape of these gain curves is determined by various transfer function characteristics within equalization linear channel 310. For shorter cables (i.e., less than 80 meters), equalization linear channel 310 preferably employs a three-pole/zero transfer function filter. For longer cables (i.e., 80 to 140 meters)

equalization linear channel 310 preferably employs a two-pole/zero transfer function filter. An equalized output signal 335 is then presented on an output line 325 of the equalization linear channel circuit 310.

For cables longer than 140 meters, equalization linear channel 310 employs the above-mentioned two-pole filter and a fixed AC boost filter activated to further boost the higher frequency components of the input waveform which are heavily attenuated at such long cable lengths.

Figure 2:
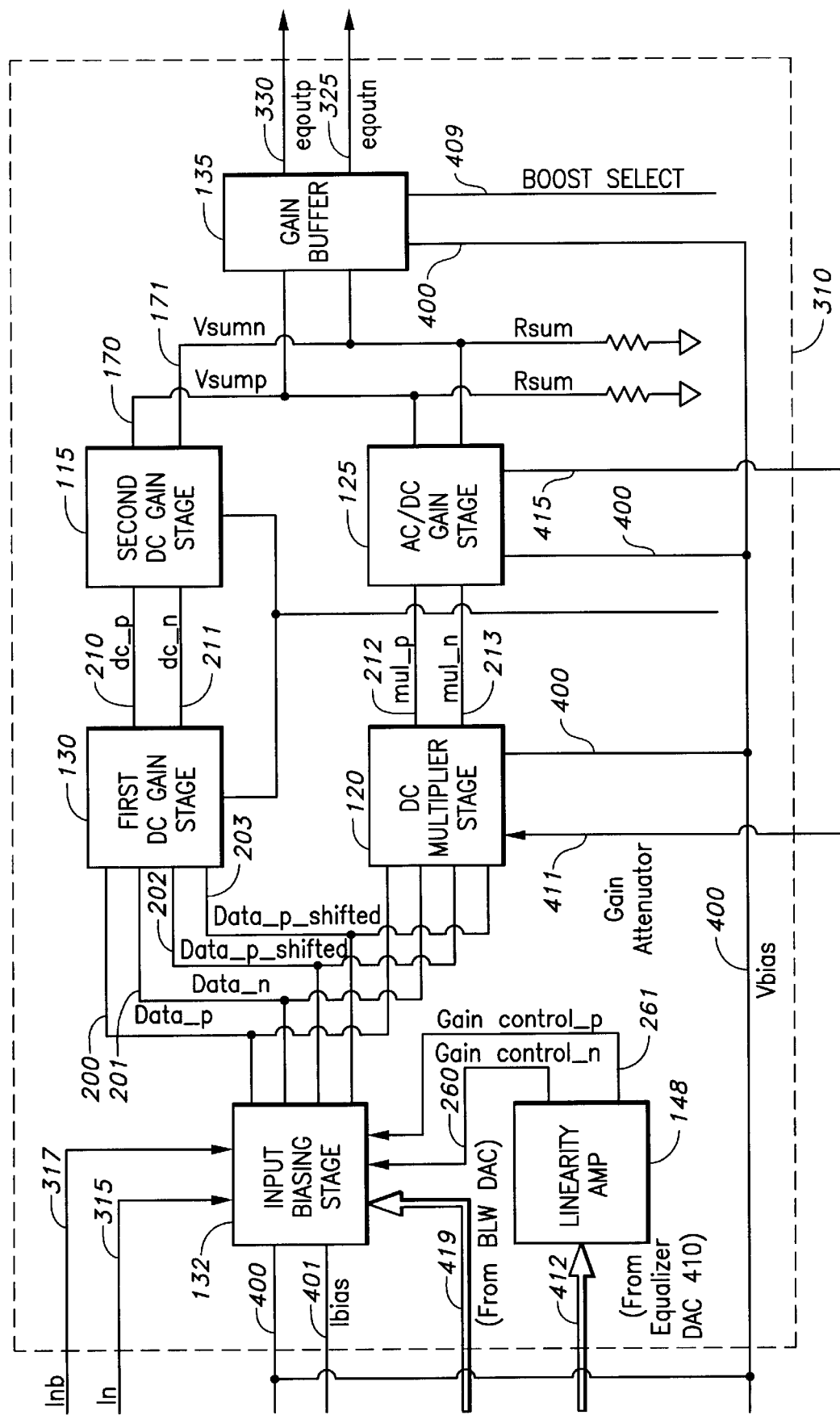
FIG. 2 is a block diagram of the equalization linear channel of FIG. 1.

FIG. 2 is a block diagram of equalization linear channel 310 in accordance with the present invention for equalizing signals received through transmission line 110 (FIG. 1). Equalization linear channel 310 includes input biasing stage 132, linearity amplifier stage 148, first DC gain stage 130, second DC gain stage 115, DC multiplier stage 120, AC/DC gain stage 125, and gain buffer stage 135. Input biasing stage 132 receives equalization gain control signals GainControl_p and GainControl_n on lines 260 and 261 respectively from linearity amplifier stage 148, and provides signals data_p on line 200, data_n on line 201, data_p_shifted on line 202 and data_n_shifted on line 203 to first DC gain stage 130 and to DC multiplier stage 120. First DC gain stage 130 provides input signals dc_p on line 210 and dc_n on line 211 to second DC gain stage 115. DC multiplier stage 120 provides input signals mul_p on line 212 and mul_n on line 213 to AC/DC gain stage 125. The second DC gain stage 115 and the AC/DC gain stage 125 output signals Vsump on line 170 and Vsumn on line 171 are the input signals to gain buffer stage 135. Gain buffer stage 135 outputs the equalization signals eqoutp on line 330 and eqoutn on line 325 which are coupled to waveform analyzer stage 350 of FIG. 1.

Input Biasing Stage 132

Figure 3:
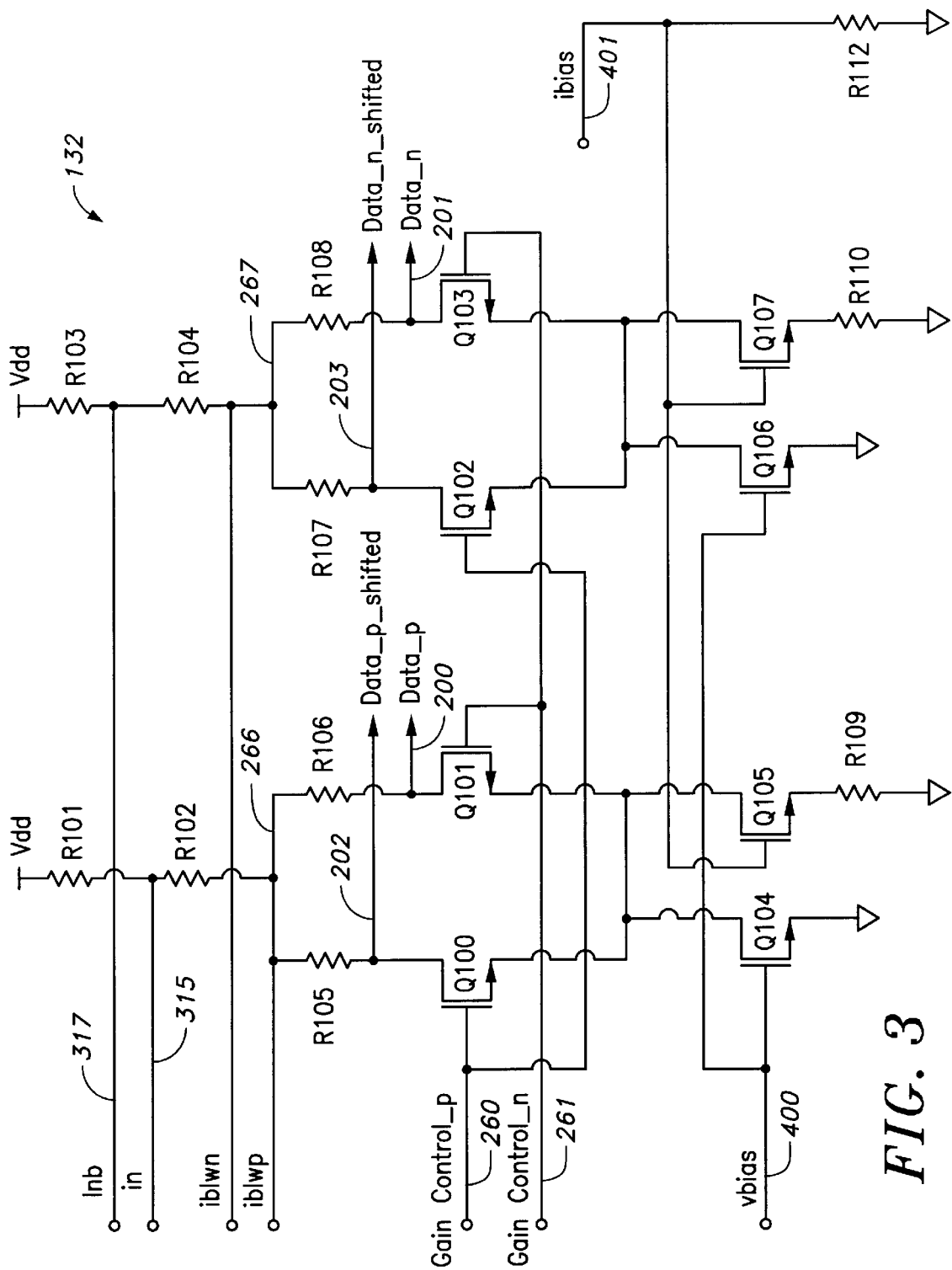
FIG. 3 shows a preferred circuit schematic of input biasing stage of FIG. 2.

FIG. 3 is a schematic of preferred input biasing stage 132, which receives the input differential signals In on line 315 and Inb on line 317. It also receives two analog signals iblwn and iblwp on control bus 419 from baseline wander (BLW) digital-to-analog converter (DAC) 410 (FIG. 1). The two signals iblwp and iblwn are zero current when there is no "baseline wander" event. When a baseline wander event is detected, one signal on the analog bus will be either a positive or a negative current depending on the magnitude and direction of the baseline wander event. The other signal will be a current equal in amplitude but opposite in polarity to that of the first signal.

Signals GainControl_p 260 and GainControl_n 261 are used to select the gain curves to be applied to input waveform 320. Input biasing stage 132 receives on line 400 a band gap-derived biasing voltage signal Vbias to establish the primary bias current of the input biasing stage. An Ibias signal on line 401 is a band gap-derived current of about 150 $\mu$a which is sourced across R112, providing a process and temperature independent voltage at the gates of transistors Q105 and Q107. Since the gate-to-source voltage drops of transistors Q105 and Q107 are both process and temperature dependent, the current through Q105, Q107, R109 and R110 will exhibit both a process and temperature dependency. For fast process corners, the currents through Q105 and Q107 will be higher than for slow process corners. The amount of current through Q105 and Q107 and the amount of process and temperature skew to this current will be determined by the w/l ratios of Q105 and Q107 and the values of R109 and R110. For fast corner circuits produced by an IC fabrication process the common mode of the data In on line 315 and Inb on line 317 relative to ground is reduced in voltage, and for slow corner circuits produced by an IC fabrication process the common mode of the data In on line 315 and Inb on line 317 relative to ground is increased. This biasing is important in ensuring that the next amplifiers in first DC gain stage 130 and in DC multiplier stage 120 (FIG. 1) will always operate as linear amplifiers despite variations in fabrication process and operating temperature.

Input biasing stage 132 outputs two pairs of differential signals. The first pair is Data_p 200 and Data_n 201 and the second pair is Data_p_shifted 202 and Data_n_shifted 203. The two differential signal pairs are equal in differential peak-to-peak amplitude. With the common mode voltage of Data_p and Data_n defined as VCM(data), the common mode voltage of Data_p_shifted and Data_n_shifted defined as VCM(data_shifted); and the voltage difference between GainControl_p and GainContol_n define as Vcontrol, there is a relationship:

$$\text{VCM(data)}-\text{VCM(data\_shifted)}=(\text{Vcontrol}/\text{Vcontrol(Max)})*0.4 \text{ Volts} \quad (3)$$

where Vcontrol(MAX) is the maximum excursion of Vcontrol.

FIG. 3 shows input biasing stage 132 in a preferred embodiment in which transistors Q104 and Q105 set the biasing current at approximately 1.5 ma to establish the common mode voltage In on line 315 equal to (VDD−1.5 ma*(R101 ohms)). Transistor Q104 conducts a fixed current of approximately 1.3 ma and transistor Q105 conducts a process and temperature dependent current. Transistors Q106 and Q107 set the biasing current at approximately 1.5 ma to establish the common mode voltage Inb on line 317 equal to (VDD−1.5 ma*(R103 ohms)). Transistor Q106 conducts a fixed current of approximately 1.3 ma and transistor Q107 conducts a process and temperature dependent current. Using bias currents which are the summation of a fixed current and a temperature and process dependent current, enables setting the common mode voltage of the differential signals In and Inb optimally for any given process and temperature. If no baseline wander event is present, the currents through and the voltage drops across resistors R102 and R104 are equal. If a baseline wander event occurs, a time varying current of programmable polarity and of amplitude proportional to the magnitude of the baseline wander event will be sourced from iblwp line 266 and a time varying current of equal amplitude but opposite polarity will be sourced from iblwn line 267. Since these currents are equal in amplitude but opposite in polarity, differential voltage swings which are equal in amplitude but opposite in polarity are developed across resistors R102 and R104. Through this process, signals on lines 266 and 267 can maintain the same common mode voltage even as the baseline wander event generates a DC shift of the common mode voltage at In line 315 versus the common mode voltage at Inb line 317. A differential voltage Vcontrol equal to GainControl_p−GainControl_n is applied across the differential transistor pair Q100 and Q101. This differential voltage will lead to a differential current through Q100 and Q101, which will lead to a differential voltage drop across R105 and R106 and thus a differential voltage (Data_p−Data_p_shifted) between Data_p and Data_p_shifted. The differential voltage Vcontrol applied across transistors Q102 and Q103 will lead to a differential current through Q102 and Q103 which will lead to a differential voltage drop across R107 and R108 and thus a differential voltage (Data_n−Data_n_shifted) between Data_n and Data_n_shifted. The common mode voltage VCM(data) will be higher than the common mode voltage VCM(data_shifted) by the amount of equation (3)

$$\text{VCM(data)}-\text{VCM(data\_shifted)}=(\text{Vcontrol}/\text{Vcontrol(Max)})*0.4 \text{ Volts} \quad (3)$$

This linearly varying dependency of the quantity VCM(data)−VCM(data_shifted) with Vcontrol is used to control the DC multiplier stage 120 (FIG. 1).

Linearity Amplifier 148

Figure 4:
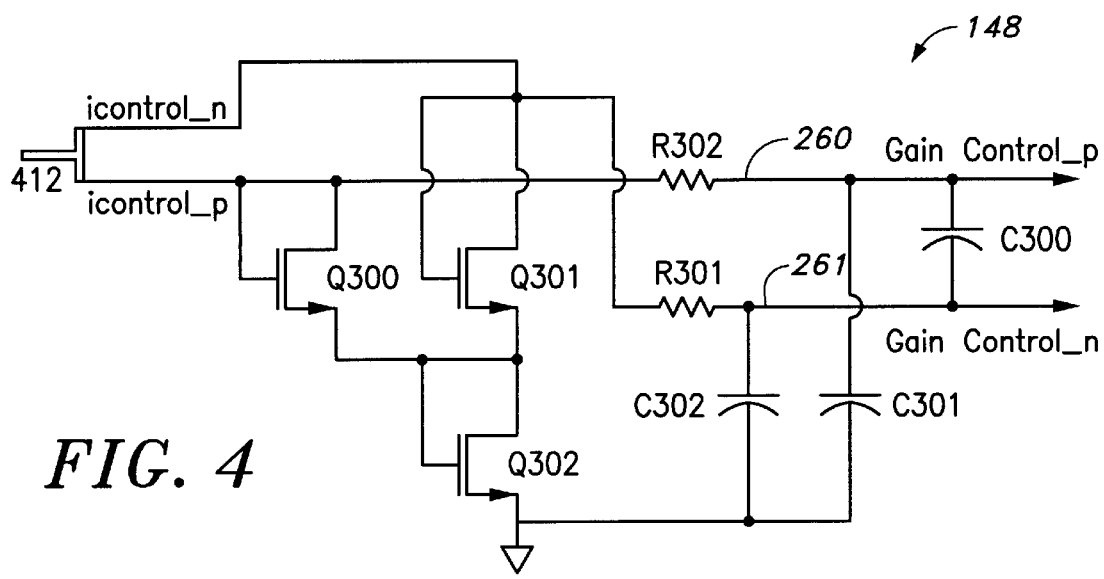
FIG. 4 shows a preferred circuit schematic of a linearizer amplifier of FIG. 2.

FIG. 4 is a schematic of a preferred embodiment of linearity amplifier 148, which receives the differential current information represented by signals icontrol_p and icontol_n on two bit bus 412 from equalizer DAC 410 (FIG. 1), and outputs a linear voltage differential signal Vcontrol equal to GainControl_p−GainControl_n. As the differential current from DAC 410 goes from 0 ma to I(max), Vcontrol goes from 0 volts to Vcontrol(MAX).

The sum of icontrol_n and icontrol_p is a constant current set by the equalizer DAC 410 (FIG. 1). When icontrol_p and icontrol_n are equal, the currents through Q300 and Q301 are equal and thus the voltages GainControl_p and GainControl_n are equal. When icontrol_n is close to zero then icontrol_p is equal to its maximum value. The differential voltage Vcontrol is at its maximum value Vcontrol(max). In general Vcontrol=K (icontrol_p−icontrol_n). K is a process and temperature dependent coefficient. The approximate linearity and maximum voltage excursion of the circuit is determined by the sum of icontrol_p and icontrol_n and the w/l ratios of Q300 and Q301, which are equal. The function of Q302 is to offset GainControl_p and GainControl_n so as to assure the linearity of the Input bias stage. R301, C302 and R302, C301 and C300 form a low pass filter, so that high frequency noise in icontrol_p and icontrol_n does not get through to the input bias stage.

DC Multiplier Stage 120

Figure 5:
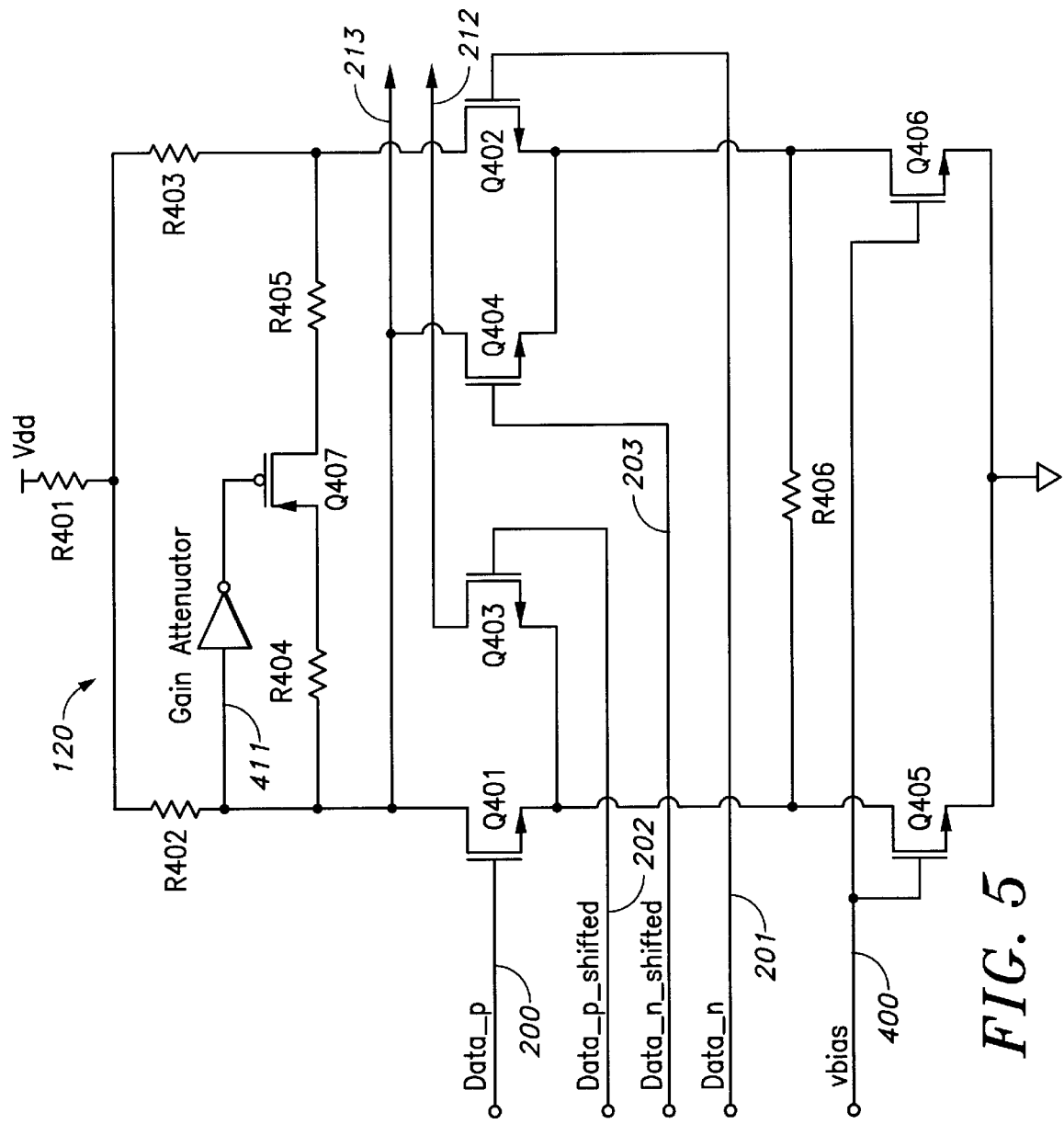
FIG. 5 shows a preferred circuit schematic of DC multiplier stage of FIG. 2.

FIG. 5 is a schematic of a preferred embodiment of DC multiplier stage 120. DC multiplier stage 120, linearity amplifier 148 and input biasing stage 132 together perform an analog multiplication function on the input data signal In on line 315 and signal Inb on line 317 (FIG. 2). Stage 120 receives two pairs of differential input signals: Data_p on line 200 and Data_n on line 201, and Data_p_shifted on line 202 and Data_n_shifted on line 203; and transmits one pair of differential output signals: mul_p on line 212 and mul_n on line 213. Stage 120 receives signal Gain Attenuator on line 411 and receives signal Vbias on line 400 which provides a band gap derived biasing voltage to establish the primary bias current of stage 120. If voltage Vin_diff is equal to Data_p−Data_n, voltage Vout_diff is equal to mulp−muln, VCM(data) is the common mode voltage of the differential pair Data_p and Data_n, and VCM(data_shifted) is the common mode voltage of Data_p_shifted and Data_n_shifted, then $$\text{Vout\_diff}=1.4*(\text{Vin\_diff}(\text{VCM(data)}-\text{VCM(data\_shifted)}))/0.4 \text{ volts} \quad (5)$$

The quantity VCM(data)−VCM(data_shifted) is related to the output of the linearity amplifier 148, Vcontrol=(GainControl_p−GainControl_n), by the equation $$\text{VCM(diff)}=(\text{Vcontrol}/\text{Vcontrol(Max)})*0.4 \text{ volts} \quad (6)$$

where VCM(diff)=VCM(data)−VCM(data_shifted). Thus $$\text{Vout\_diff}=(1.4*\text{Vin\_diff}*\text{Vcontrol})/\text{Vcontrol(Max)} \quad (7)$$

which shows that Vout_diff is proportional to the product of Vin_diff times Vcontrol and varies from a minimum value of Vout_diff=0 when Vcontrol=0 to a maximum value of Vout_diff=1.4*Vin_diff when Vcontrol=Vcontrol(Max). In decibels, the gain is 20*Log(1.4*(Vcontrol/Vcontrol (Max))).

DC multiplier circuit 120 is implemented as a cross-coupled transconductance amplifier. When VCM(data) is equal to VCM(data_shifted) the currents through transistors Q401 and Q403 are equal and the currents through transistors Q404 and Q402 are equal. Thus, due to the cross-coupled arrangement of these transistors, no differential current flows through resistors R402 and R403 and thus no differential voltage builds up between mul_p and mul_n. When VCM(data) is higher than VCM(data_shifted) by the maximum of 0.4 Volts, transistors Q403 and Q404 are totally off, and the buffer functions as a transconductance buffer with a gain in decibels of 20*Log(1.4)=2.9 db. The maximum gain of 2.9 db is set primarily by the ratio of 2*R402/R406, the transconductances of transistors Q401 and Q402 and the bias currents through transistors Q401 and Q402. Because multiplier circuit 120 has only one level of differential structures, as compared to a Gilbert multiplier having a stacked differential structure, circuit 120 can operate at a high bias current of approximately 1 ma without experiencing voltage headroom problems. The high biasing current and low resistance load resistors R402 and R403 allow for a high bandwidth circuit with a 3 db roll-off frequency greater than 200 Megahertz. In normal operation, transistor Q407 is "Off" and no current flows through resistors R404 and R405. In the process of adaptive equalization system 150 (FIG. 1) going through its training cycle, the Gain Attenuator pin 411 puts transistor Q407 in its "On" state. When Gain Attenuator is high, transistor Q407 is "On" and the gain of DC multiplier stage 120 is reduced to 20*Log (1.19*(Vcontrol/Vcontrol(Max))).

T

The reduction in gain is determined primarily by the resistance ratio of resistors R404 to R402. The entire biasing current of the DC Multiplier stage 120 flows across R401. The generated constant voltage drop is used to ideally set the common mode voltages of mul_p and mul_n, so as to assure the linearity of both the DC multiplier stage 120 and the AC/DC gain stage 125. For the 3 volt application, R401 would typically be equal to zero ohms.

First Gain Stage 130

Figure 6:
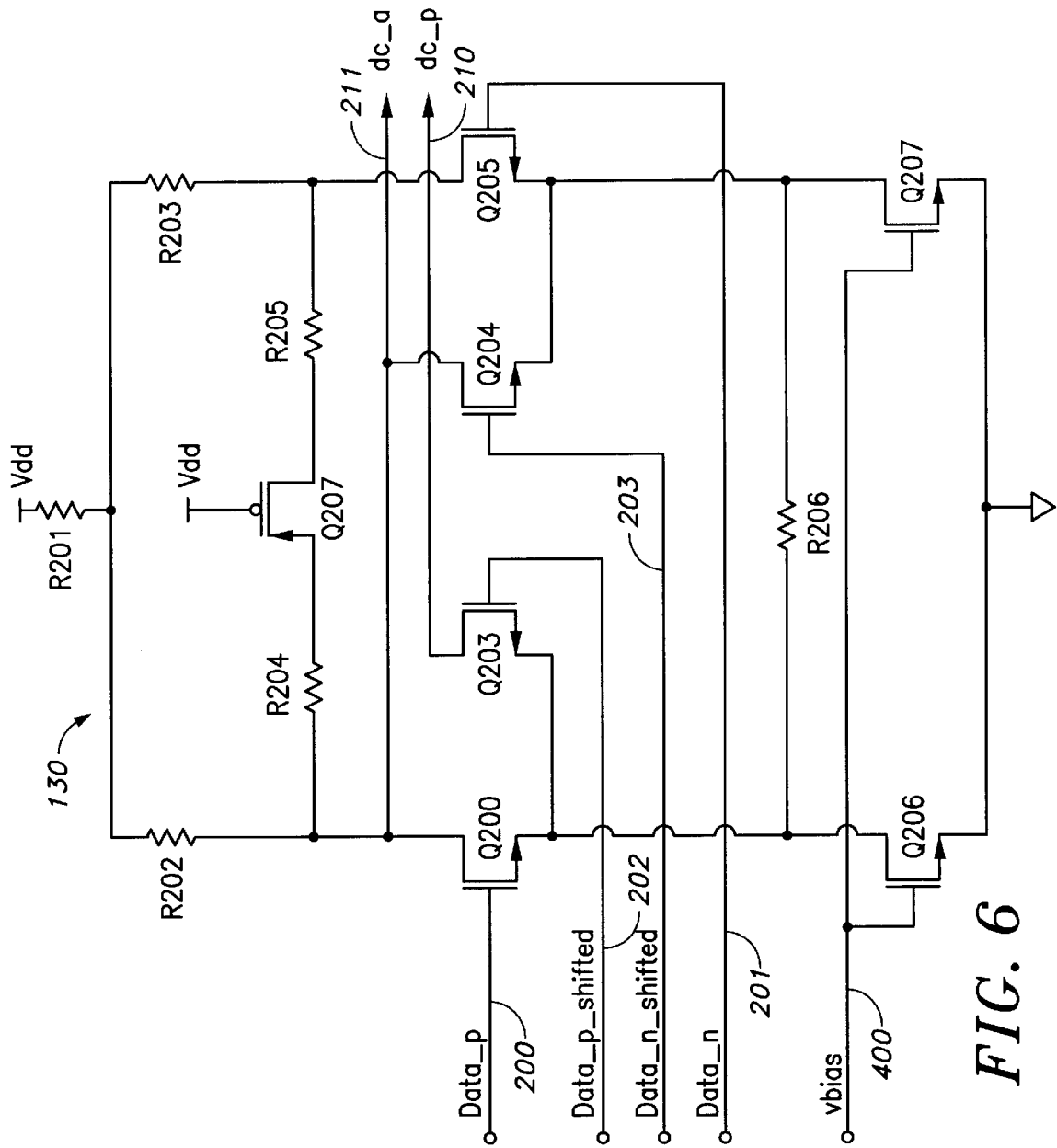
FIG. 6 shows a preferred circuit schematic of first DC gain stage of FIG. 2.

FIG. 6 is a schematic of a preferred embodiment of first DC gain stage 130, which has two pairs of differential input signals Data_p on line 200 and Data_n on line 201, and Data_p_shifted on line 202 and Data_n_shifted on line 203; and one pair of differential output signals DC_p on line 212 and DC_n on line 213. Stage 130 also receives a signal Vbias on line 400 which provides a band gap derived biasing voltage to establish the primary bias current of stage 130. If Data_p−Data_n is equal to Vin_diff and Vout_diff is equal to DC_p−DC_n, then 20*Log(Vout_diff/Vin_diff)=2.9 db. The gain of first DC gain stage 130 matches that of DC multiplier stage 120 in its highest gain condition.

First DC gain stage 130 is preferably implemented as a transconductance amplifier with a gain determined by the ratio 2*R202/R206, the transconductances of transistors Q200, Q203, Q204, and Q205, and the bias currents through transistors Q200, Q203, Q204 and Q205. Because amplifier 130 has only one level of differential structures, it can operate at a high bias current of approximately 1 ma per leg without experiencing voltage headroom problems. The high biasing current and low load resistors allow for a high bandwidth circuit with a 3 db roll-off frequency greater than 200 Megahertz. Because both first DC gain stage 130 and DC multiplier stage 120 are implemented as differential structures with output resistors tied to the power supply, these circuits exhibit good power supply noise immunity.

The entire biasing current of the first DC gain stage 130 flows across R201. The generated constant voltage drop is used to ideally set the common mode voltages of DC_p and DC_n so as to assure the linearity of both the first DC gain stage 130 and the second DC gain stage 115. For the 3 volt application, R201 would typically be equal to zero ohms.

Second DC Gain Stage 115

Figure 7:
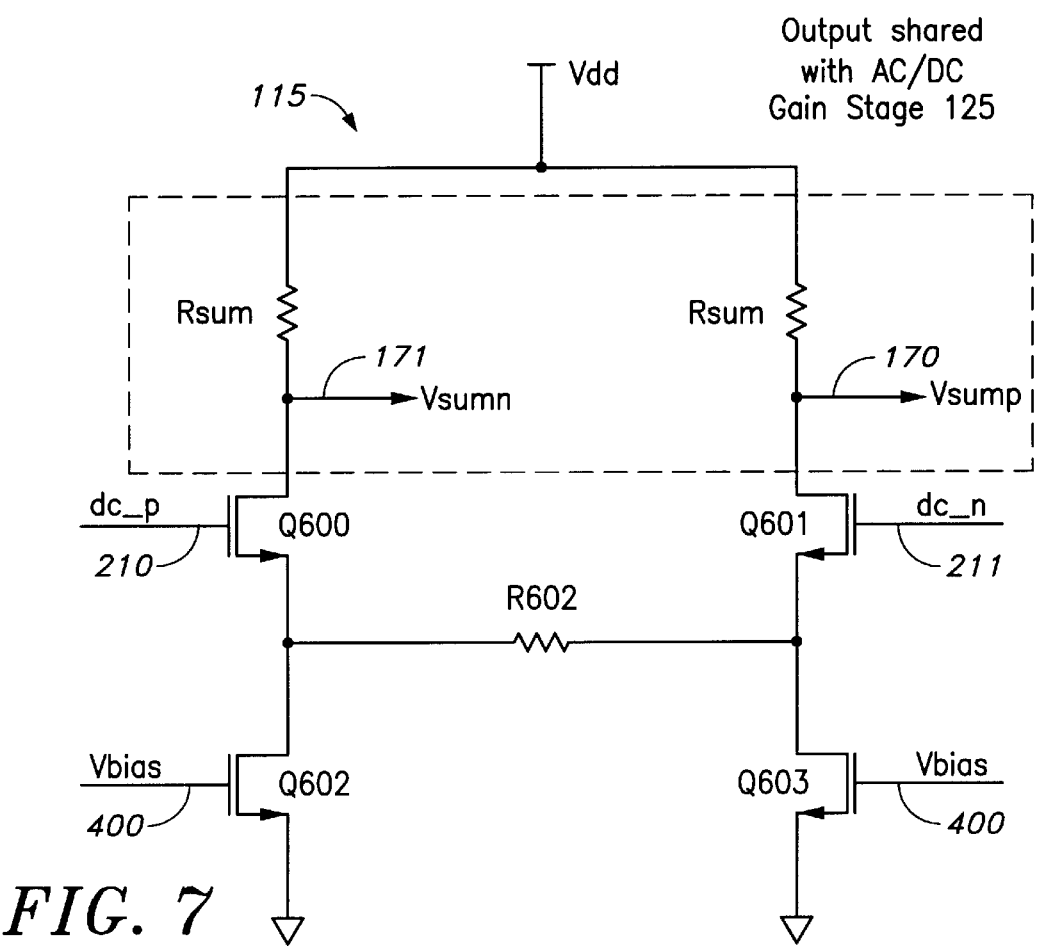
FIG. 7 shows a preferred circuit schematic of second DC gain stage of FIG. 2.

FIG. 7 is a schematic of a preferred embodiment of second DC gain stage 115, which is a transconductance amplifier stage. Stage 115 receives one pair of differential input signals DC_p on line 210 and DC_n on line 211, and transmits one pair of differential output signals Vsump on line 170 and Vsumn on line 171. These output signals are common with the output signals of AC/DC gain stage 125. Stage 115 also receives the signal Vbias on line 400, which provides a band gap derived biasing voltage used to establish the primary bias current of stage 115. If Vin_diff is equal to DC_p–DC_n and Vout_diff is equal to Vsump–Vsumn, then 20*Log(Vout_diff/Vin_diff)=–10.45 db. The gain is primarily determined by the ratio of 2*Rsum/R602 and the transconductances of transistors Q600 and Q601 and the bias currents through transistors Q600 and Q601. Because amplifier 115 has only one level of differential structures, it can operate at a high bias current of approximately 1 ma per leg without experiencing voltage headroom problems. The high biasing current and low load resistors allow for a high bandwidth circuit with a 3 db roll-off frequency greater than 200 Megahertz. Because second DC gain stage 115 is implemented as a differential structure with output resistors referenced to the power rail, this circuit exhibits good power supply noise immunity.

AC/DC Gain Stage 125

Figure 8:
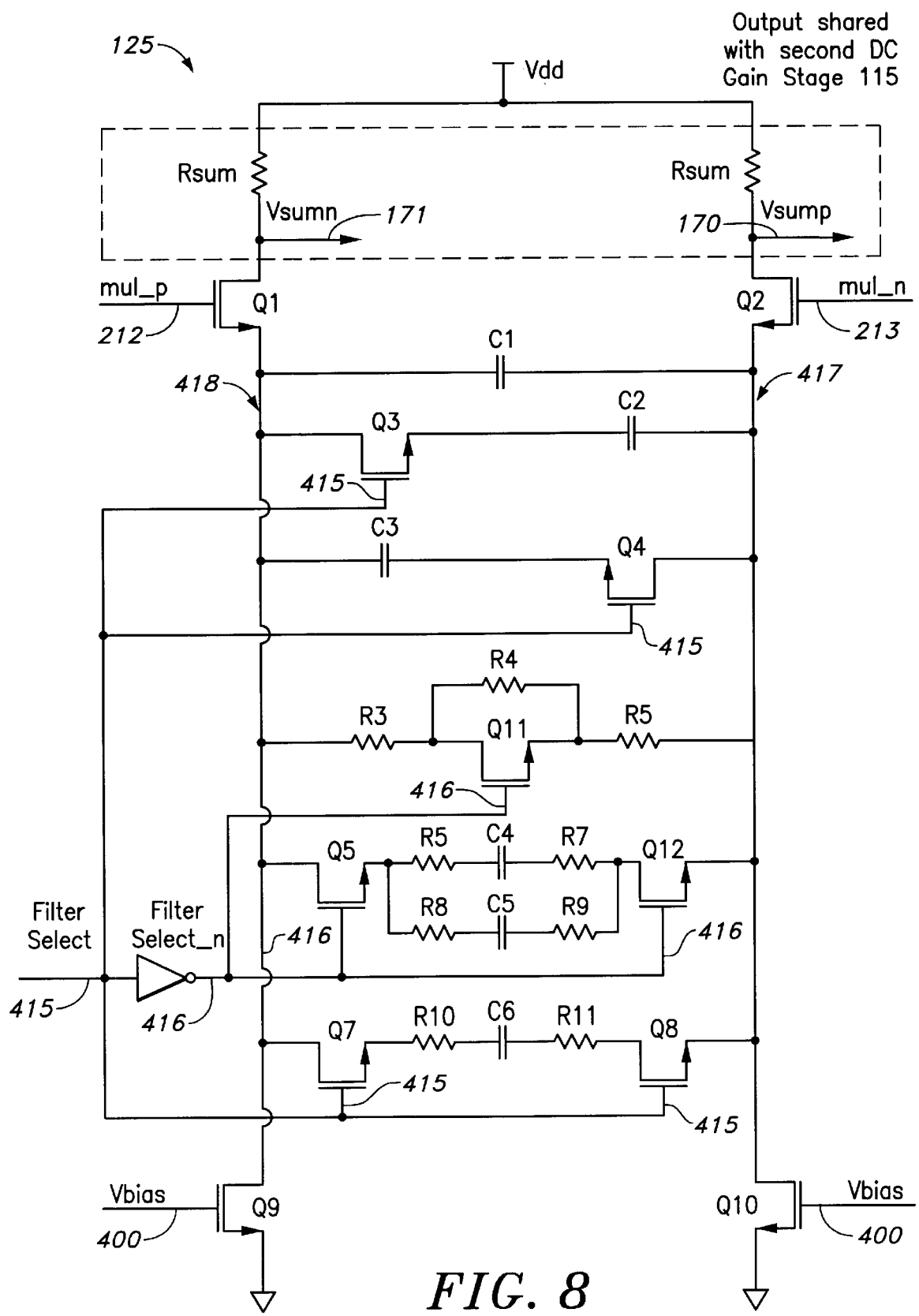
FIG. 8 shows a preferred circuit schematic of AC/DC gain stage of FIG. 2.

FIG. 8 is a schematic of a preferred embodiment of AC/DC gain stage 125, which is a transconductance amplifier stage with a dual state programmable filter integrated as the differential source impedance. The filter state is selected by the binary signal Filter Select on line 415. For state one (short cable) with Filter Select=0 volts, the filter is implemented as a three pole/zero high pass filter in parallel with a DC gain component. For state two (long cable), the filter is implemented as a two pole/zero high pass filter in parallel with a different DC gain component. AC/DC gain stage 125 receives input signals mul_p on line 212 and mul_n on line 213 and transmits output signals Vsump on line 170 and Vsumn on line 171. The output signals are shared with second DC gain stage 115.

When the Filter Select signal on line 415 is low, the first pole/zero of the filter is set by capacitor C1. Since the Filter Select signal is low, transistor Q3 is "Off" and there is a differential capacitance from capacitor C2 in series with the small source-to-drain capacitance of transistor Q3 in its "Off" state. This series capacitance is small relative to the other capacitances in the circuit. Since Filter the Select signal is low, transistor Q4 is also "Off" and there is a differential capacitance from capacitor C3 in series with the small source-to-drain capacitance of transistor Q4 in its "Off" state. This series capacitance is small relative to the other capacitances in the circuit. Since the Filter Select_n signal on line 416 is high, transistors Q5 and Q12 behave as switches in the low impedance "On" state. The second pole/zero is formed by capacitor C4 in series with resistors R6 and R7. The third pole/zero is formed by capacitor C5 in series with resistors R8 and R9. Since the Filter Select signal is low, transistors Q7 and Q8 are "Off" and therefore capacitor C6 in series with resistors R10 and R11 has very little effect on the frequency dependent (AC) characteristics of the filter in the low cable state. The DC gain is largely determined by the ratio (Rsum*2)/(R3+R4+R5), and is also affected by the transconductances of the differential transistor pair Q1 and Q2.

In the low Filter Select state, transistor Q11 is "Off." When the Filter Select signal is high, the first pole/zero of the differential filter between 418 and 417 is determined by capacitors C1, C2 and C3 in parallel. Since the Filter Select signal is high, transistors Q3 and Q4 behave as switches in the very low impedance "On" state. The second pole/zero of the filter is determined by capacitor C6 in series with resistors R10 and R4. Since the Filter Select signal is high, both transistors Q7 and Q8 are "On" and have low impedance relative to resistors R10 and R11. Since the Filter Select_n signal on line 416 is low, transistors Q5 and Q12 are "Off" and the filters formed by resistors R6, R7, R8 and R9 and capacitors C4 and C5 have very little effect on the AC characteristics. The DC gain is largely determined by the ratio (Rsum*2)/(R3+R5). In the Filter Select high state, transistor Q11 is "On" and effectively shorts resistor R4. The DC gain is also affected by the transconductances of the differential transistor pair Q1 and Q2. Transistors Q9 and Q10 each provide a biasing current of approximately 1 ma.

Because AC/DC gain stage 125 has only one level of differential structures, it can to operate at a high bias current of approximately 1 ma per leg without experiencing voltage headroom problems. The high biasing current and low load resistors allow for a high bandwidth circuit with a 3 db roll-off frequency greater than 200 Megahertz. Because this amplifier is implemented as differential structures with its output resistor, Rsum, tied to the power supply, this circuit exhibits immunity to power supply noise. The purpose of AC/DC gain stage 125 is to provide both a frequency independent (DC) and a frequency dependent (AC) boost to the differential input data signal mul_p on line 212 and signal mul_n on line 213. When the Filter Select signal is low, the DC and AC boost characteristics of AC/DC gain stage 125 provide both the DC and AC boost required to restore the DC and frequency dependent AC loss of data as it is transmitted down a category five twisted pair cable 80 meters long, except for a frequency independent gain factor. Category 5 is the recommended grade of unshielded twisted pair copper wire to be used for fast (100 Mbits) Ethernet installations. When the Filter Select signal is low and data is received through a category five twisted pair cable 80 meters long, adaptive equalization system 150 (FIG. 1) will typically drive DC multiplier stage 120 to its highest gain value. When DC multiplier stage 120 is at its highest gain of 2.9 db, its output signals, mul_p and mul_n, are in phase and equal in amplitude to the output signals DC_p and DC_n of first DC gain stage 130. The gain seen on Vsump line 170 and Vsumn line 171 due to second DC gain stage 115 and AC/DC gain stage 125 is the summation of the gains through each of these two buffers. Second DC gain stage 115 has a frequency independent gain of approximately –10.45 db and the AC/DC gain stage 125 has both a DC gain, component of approximately –26 db and a frequency dependent gain component due to the three pole/zero high pass filter. When the two DC gains are summed together the resultant DC gain is –9.1 db which is approximately 1.35 db higher than the DC gain of second DC gain stage 115 alone. After the signal travels along 80 meters of category five cable, the DC component of the signal is –1.4 db down from its originally transmitted value. The invention is able to restore this lost DC content by the 1.35 db DC gain added by the DC gain component of AC/DC gain stage 125.

Figure 10:
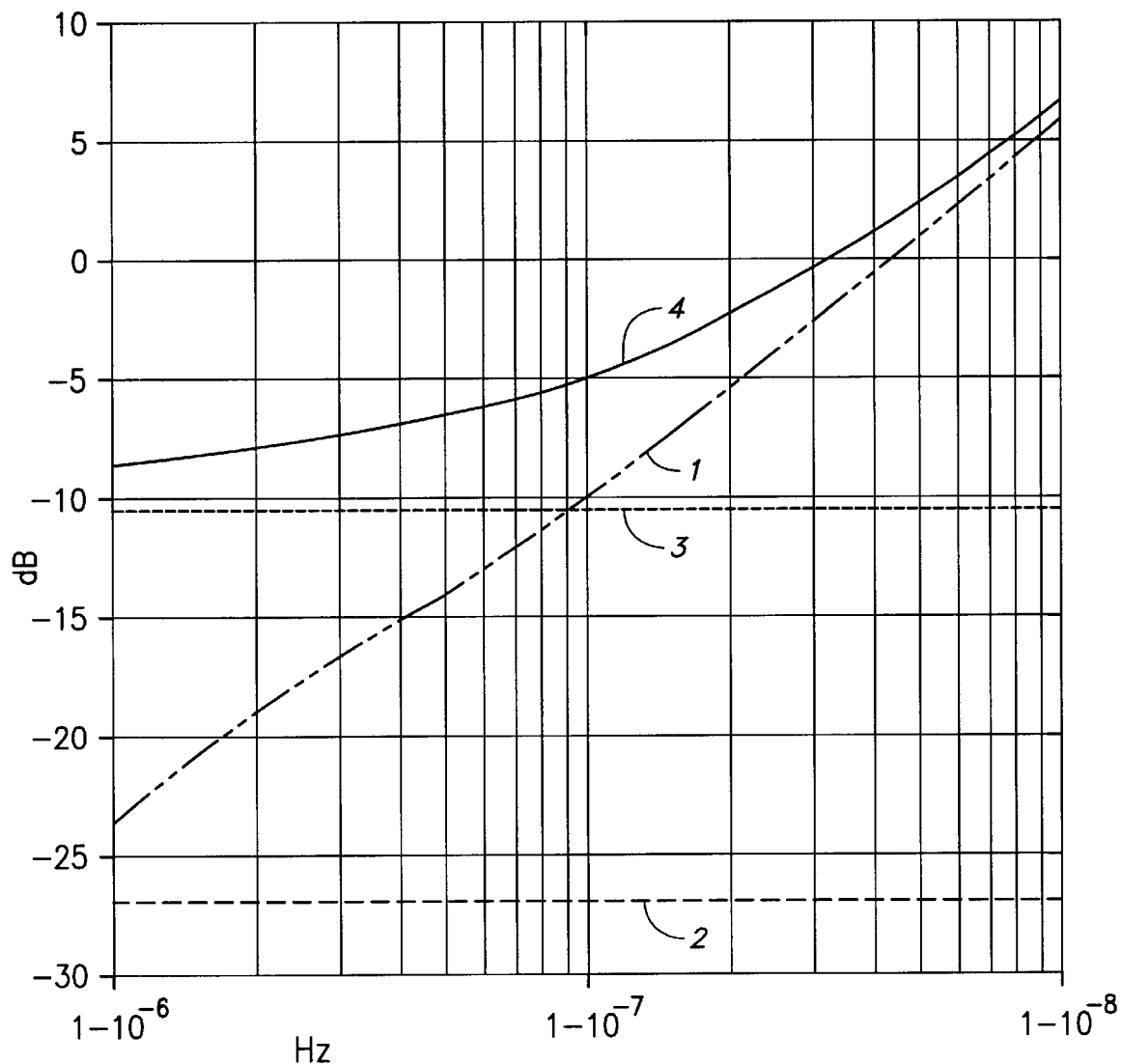
FIG. 10 is a graph showing contributions to the gain for a short cable.

FIG. 10 shows four curves on a plot with the y-axis measuring gain in decibels (db) and the x-axis measuring frequency on a log scale. This plot shows each of the contributions to the gain for short cable due to (1) the AC filter of AC/DC gain stage 125, (2) the DC component of AC/DC gain stage 125, (3) the gain of second DC Gain stage 115 and (4) the summation of these three gain contributions.

Figure 11:
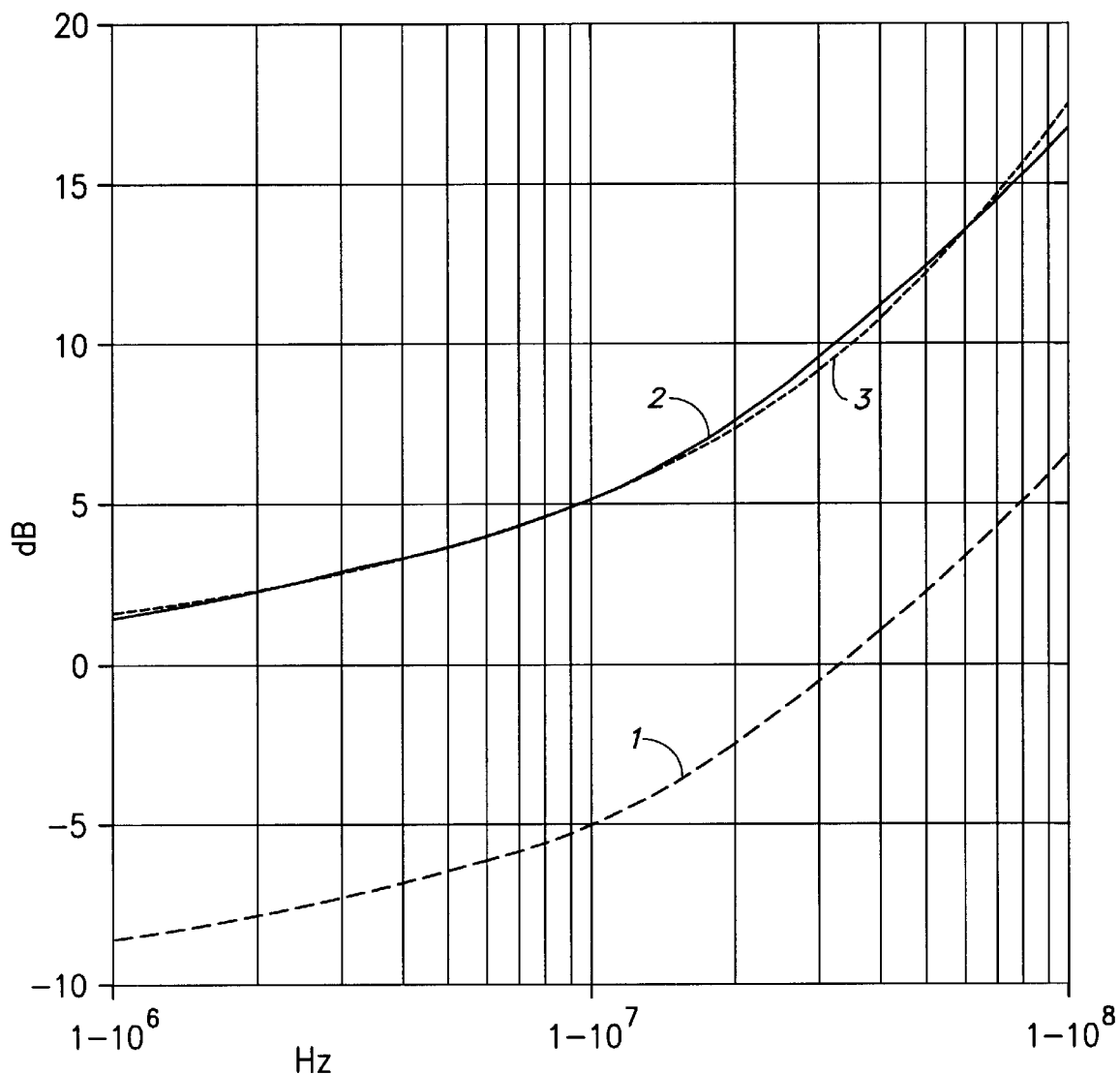
FIG. 11 shows the summed gain from FIG. 10, the summed gain multiplied by a constant factor and the inverse of cable attenuation versus frequency for a category five twisted pair cable 80 meters long.

FIG. 11 is a plot of (1) the summed gain from FIG. 10, (2) the summed gain multiplied by a constant factor of 10 db and (3) the inverse of cable attenuation versus frequency for a category five twisted pair cable 80 meters long. The similarity of curves (2) and (3) shows that the summation of the gains of second DC gain stage 115 and of AC/DC gain stage 125 multiplied by a frequency independent gain factor can compensate for the 80 meter AC and DC attenuation.

When the Filter Select signal on line 415 is high, the DC and AC boost characteristics of AC/DC gain stage 125 provide both the DC and AC boost required to restore the DC and AC loss of data as it is transmitted a category five twisted pair cable 140 meters long, except for a frequency independent gain factor. When Filter Select is high, and if data is sent through a category five twisted pair cable 140 meters long to adaptive equalization system 150, adaptive equalization system 150 typically drives DC multiplier stage 120 to its highest gain value of 2.9 db, at which its outputs, mul_p and mul_n, are in phase and equal in amplitude to the outputs DC_p and DC_n of first DC gain stage 130. The gain at Vsump 170 and Vsumn 171 due to second DC gain stage 115 and AC/DC gain stage 125 is the summation of the gains through these two buffers. The second DC gain stage has a frequency-independent gain of approximately −10.45 db and the AC/DC gain stage 125 has both a DC gain component of approximately −22 db and a frequency-dependent gain component due to the two pole/zero high pass filter. The sum of the two DC gains is −8.4 db, which is approximately 2.05 db higher than the DC gain of the second DC gain stage 115 only. After traveling along 140 meters of category five twisted pair cable, the DC component of the transmitted signal is −2.5 db down from its original transmitted value. Most of this lost DC content can be restored by the 2.05 db DC gain added by the DC gain component of AC/DC gain stage 125.

Figure 12:
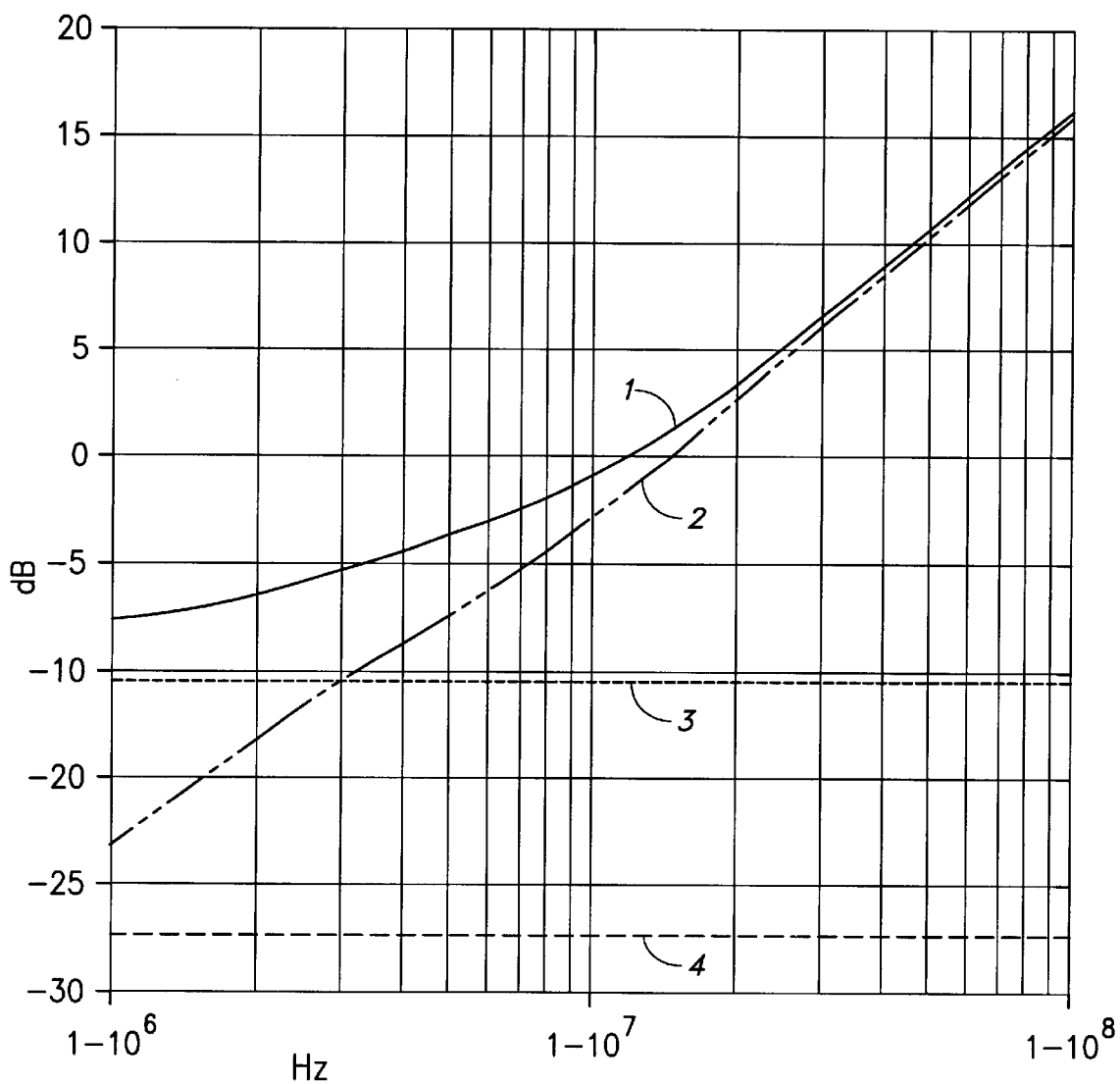
FIG. 12 shows contributions to the gain for a long cable.

FIG. 12 is a plot of four curves with the y-axis measuring gain in db and the x-axis measuring frequency on a log scale. This plot shows each of the contributions to the gain for long cable due to (1) the two pole AC filter of AC/DC gain stage 125, (2) the DC component of the AC/DC gain stage 125, (3) the DC gain of second DC gain stage 115, and (4) the summation of these three gain contributions.

Figure 13:
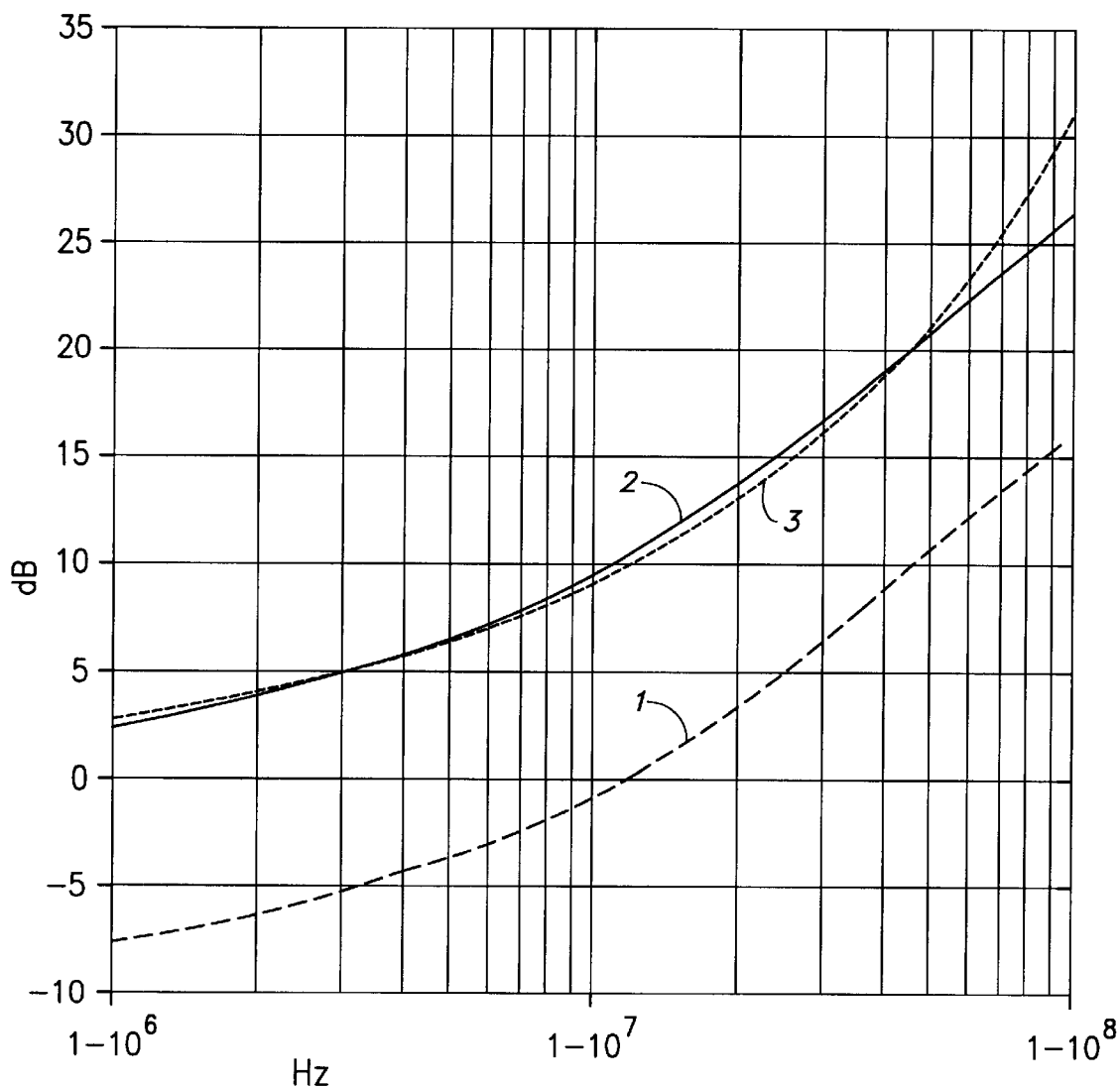
FIG. 13 shows the summed gain from FIG. 12, the summed gain multiplied by a frequency independent constant factor and the inverse of cable attenuation versus frequency for a category five twisted pair cable 140 meters long.

FIG. 13 is a plot of (1) the summed gain from FIG. 12, (2) the summed gain multiplied by a frequency independent constant factor of 10 db and (3) the inverse of cable attenuation versus frequency for a category five twisted pair cable 140 meters long. The similarity of curves (2) and (3) shows that the summation of the gains of second DC gain stage 115 and of AC/DC gain stage 125 multiplied by a frequency independent gain factor can compensate for the AC and DC attenuation from 140 meters of cable.

Of particular importance was the placing of the AC/DC Gain stage 125 after the DC multiplier stage 120 rather than vice-versa. If the AC/DC Gain stage 125 were placed before the DC multiplier stage, then even short cable signals with very little high frequency attenuation would have their high frequency components heavily amplified by the AC/DC Gain stage. The resultant heavily distorted signal would be presented to the DC multiplier stage. It would have been possible for there to be unwanted differential and/or common mode noise on the output of the DC multiplier stage which would lead to errors in the equalization algorithm. By placing the DC multiplier stage before the AC/DC Gain stage, only the necessary diffenential signal is presented by the DC multiplier stage to the AC/DC Gain stage.

Gain Buffer 135

Figure 9:
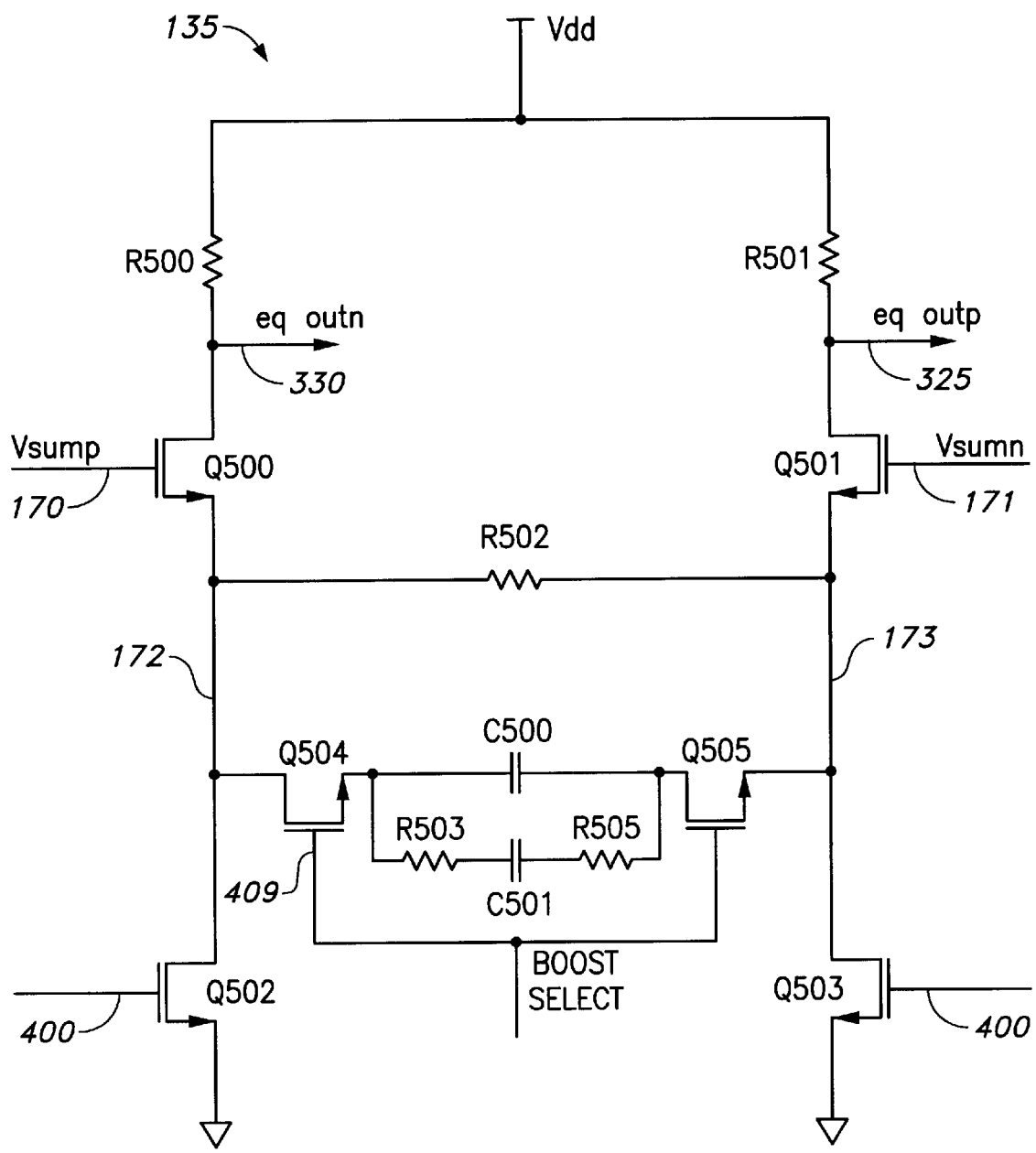
FIG. 9 shows a preferred circuit schematic of a gain buffer of FIG. 2.

FIG. 9 is a schematic of a preferred embodiment of gain buffer 135, which is a transconductance buffer with a dual state programmable filter integrated as the differential source impedance. The filter state is selected by the binary signal Boost Select on line 409. Gain buffer 135 receives differential input signals Vsump on line 171 and Vsumn on line 170, and transmits differential output signals eqoutn on line 330 and eqoutp on line 325. Gain buffer 135 also receives a band gap derived biasing voltage signal Vbias on line 400 to establish the primary bias current of gain buffer 135. When the Boost Select signal on line 409 is low, gain buffer 135 acts as a transconductance buffer with a constant gain equal to approximately 7.6 db up to frequencies greater than 200 Megahertz. When the Boost Select signal is high, gain buffer 135 has a gain of 7.6 db for low frequencies, but high frequencies are boosted an additional amount by a high pass filter which is turned "On" by Boost Select being high. This additional AC boost is typically that required to restore the high frequency AC loss when a signal is sent through a twenty meter category five twisted pair cable. The Boost Select signal typically goes high when adaptive equalization system 150, of which equalization linear channel 310 is part (FIG. 1), determines that the category five twisted pair cable to which it is attached is longer than 140 meters. By adding additional high frequency boost, equalization linear channel 310 is able to properly equalize signals transmitted along up to approximately 160 meters of category five twisted pair cable.

When the Boost Select signal is low, the gain is determined primarily by the ratio (2*R500/R502) and also by the transconductances of transistors Q500 and Q501 and bias currents through transistors Q500 and Q501. The gain, which is equal to as 20*Log((eqoutp−eqoutn)/(Vsump−Vsumn)), is approximately equal to 7.6 db up to frequencies greater than 200 Megahertz when Boost Select is low. When Boost Select is low, transistors Q504 and Q505 are in their high impedance "Off" state and thus the gain versus frequency response of the buffer is unaffected by the two pole high pass filter comprised of capacitor C500 in parallel with the series combination of resistor R503, capacitor C501, and resistor R504. When Boost Select is high, transistors Q504 and Q505 are in their low impedance "On" state. The differential source impedance of the buffer now includes the two pole/zero high pass filter comprised of a first pole/zero determined primarily by capacitor C500 and a second pole/zero determined primarily by capacitor C501 in series with resistors R503 and R504. For low frequencies, the gain of buffer 135 is still approximately 7.6 db, but for higher frequencies the gain is increased. Because gain buffer 135 is implemented with only one level of differential transistor structures, it can operate at a high bias current of approximately 1 ma without experiencing voltage headroom problems. The high biasing current and low resistance output resistors R500 and R501 allow for a circuit with a 3 db roll-off frequency greater than 200 Megahertz. The differential structure with output resistors tied to the power rail has excellent power supply noise immunity.

Operation

Four modes of operation will be described with reference to the table of FIG. 21. These modes are controlled by the signals Gain Attenuator on line 411 (FIG. 5), Filter Select on line 415 (FIG. 8), and Boost Select on line 409 (FIG. 9), which are sourced from digital logic control stage 405 (FIG. 1) to equalization linear channel 310. Once adaptive equalization system 150 determines which mode of operation equalization linear channel 310 is to operate in, the equalizer DAC 410 output on two bit bus 412 (FIG. 1) controls how much AC and DC boost is added to input waveform 320.

In mode 1 the Gain Attenuator signal on line 411 is high (=1), the Filter Select signal on line 415 is low (=0), and the Boost Select signal on line 409 is low (=0). The differential input waveform 320 is carried on lines In 315 and Inb 317 to input biasing stage 132. Input biasing stage 132 sets the common mode voltage of signals In on line 315 and Inb on line 317 relative to the power rail, and outputs two pairs of differential signals Data_p 200 and Data_n 201, and Data_p_shifted 202 and Data_n_shifted 203. Each of these two pairs of signals is equal in amplitude and in phase with the input data pair of signals In on line 315 and Inb on line 317. The difference in the common mode voltages of these two pairs of signals is linearly dependent on the magnitude of the difference between the current carried on icontol_p and icontrol_n of the two bit bus 412 (FIG. 4). The two pairs of signals (Data_p, Data_n and Data_p_shifted, Data_n_shifted) are received by first DC Gain stage 130, which has a gain of 2.9 db. The differential signals DC_p and DC_n are received by the second DC gain stage 115 (FIG. 1), which outputs the differential signals Vsump on line 170 and Vsumn on line 171. The differential output of second DC gain stage 115, (Vsump−Vsumn), is formed as the arithmetic sum of the −10.45 db gain due to second DC gain stage 115 and the gain due to AC/DC gain stage 125. Thus as a result of going through first and second DC gain stages 130 and 115, the differential voltage Vsump−Vsumn has one contribution equal to 2.9 db*(−10.45 db)=−7.55 db. The two pairs of signals (Data_p, Data_n and Data_p_shifted, Data_n_shifted) are also received by DC multiplier stage 120. The output signals of DC multiplier stage 120 are mul_p on line 212 and mul_n on line 213. The differential output Vout_diff is equal to (mul_p−mul_n). If the difference in the common mode voltage of Data_p, Data_n and the common mode voltage of Data_p_shifted, Data_n_shifted is defined as VCM(diff) and if Gain Attenuator 411 is high then $$20*Log(Vout\_diff/Vin\_diff)=20*Log(1.19*(Vcontrol/Vcontrol-(Max))) \quad (8)$$

where Vin_diff is defined as (Data_p−Data_n). When the delta current defined as (icontrol_p−icontrol_n) equals zero (FIG. 4), then Vcontrol defined as (GainControl_p GainControl_n) equals zero and Vout_diff equals zero. When the delta current defined as (icontrol_p−icontrol_n) equals I(Max), then Vcontrol equals Vcontrol(Max) and the gain is a maximum value of 1.51 db. The DC multiplier stage output is received by AC/DC gain stage 125. In the Filter Select=0 mode, AC/DC gain stage 125 has a gain versus frequency response characterized by a DC gain of −26 db and an AC gain determined by a three pole high pass filter. The gain through DC multiplier stage 120 and through AC/DC gain stage 125 is 20*Log(1.19*(Vcontrol/Vcontrol (max)))*(gain of AC/DC gain stage). This gain is summed with the −7.55 db gain due to first and second DC gain stages 130 and 115. The differential signals Vsump and Vsumn are received by gain buffer 135. With Boost Select 409 equal zero, the gain of gain buffer 135 is 7.6 db.

Figure 14:
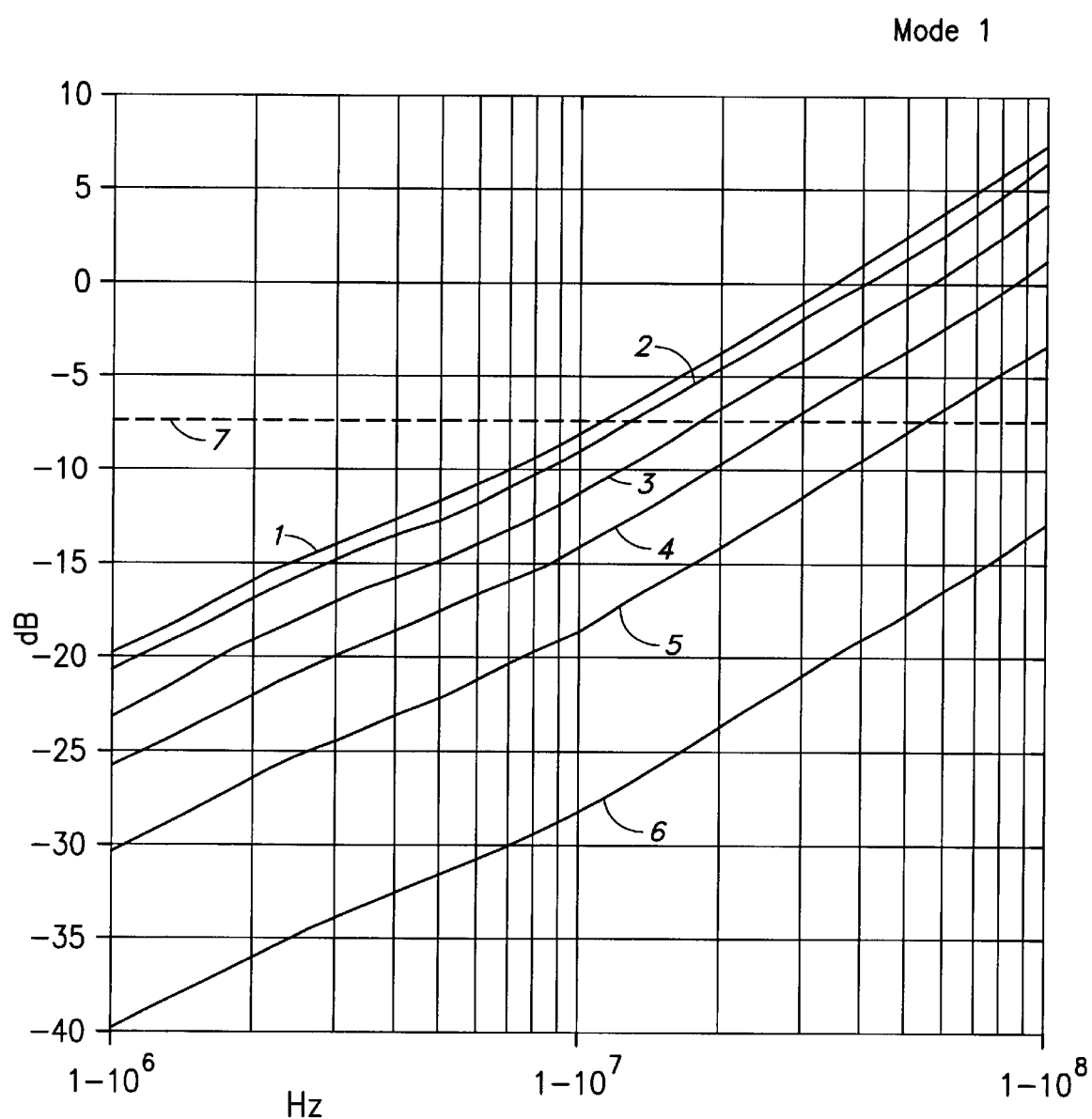
FIG. 14 shows the gain through the first and second DC gain stages and the gain through the DC multiplier stage and the AC/DC gain stage as a function of the ratio Vcontrol/Vcontrol(Max) as this ratio goes from 0.1 to 1.0 (in mode 1).

FIG. 14 is a plot showing both the gain through first and second DC gain stages 130 and 115 and the gain through DC multiplier stage 120 and AC/DC gain stage 125 as a function of the ratio (=Vcontrol/Vcontrol(Max) as this ratio (goes from 0.1 to 1.0. Curves 1–6 represent (at 1.0, 0.9, 0.7, 0.5, 0.3 and 0.1 respectively. Curve 7 represents the gain of first DC gain stage 130 multiplied by the gain of second DC gain stage 115.

Figure 15:
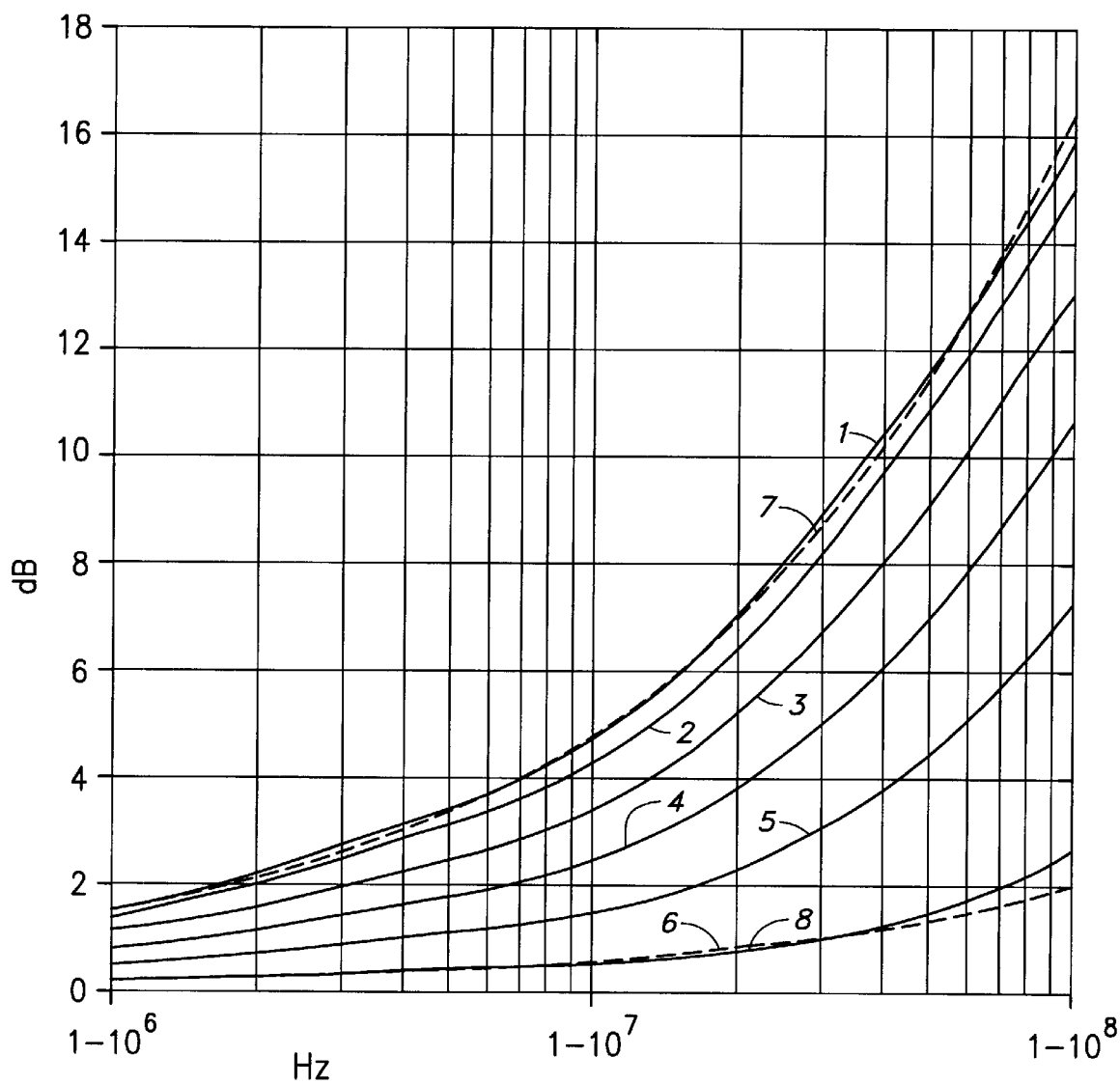
FIG. 15 shows the summation of the gains of the gain curves from FIG. 14 multiplied by 7.6 db for several values of the Vcontrol/Vcontrol(Max) ratio and the cable attenuation curves for cable lengths of 9 meters and 75 meters (in mode 1)
Figure 16:
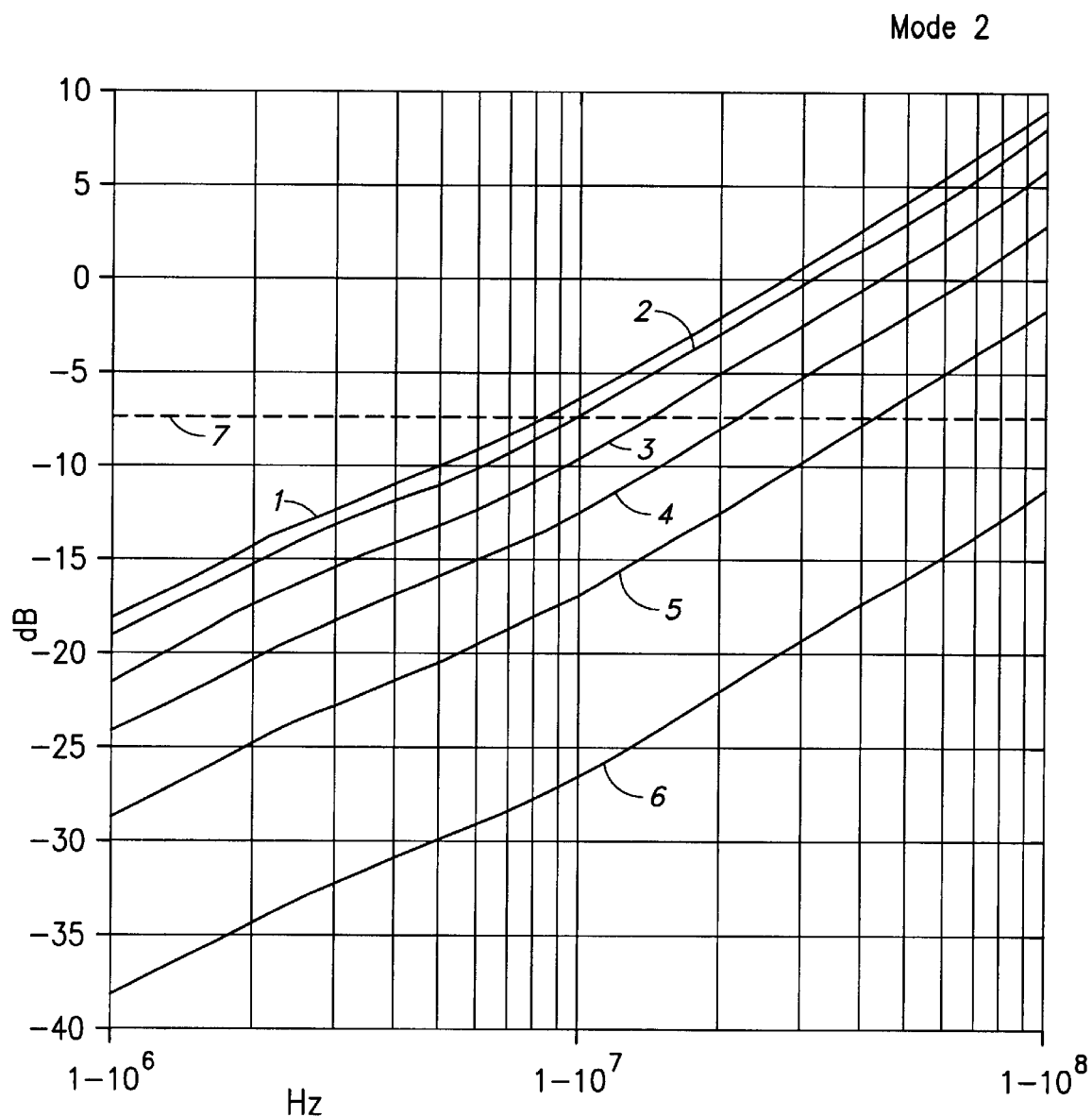
FIG. 16 shows the gain through the first and second DC gain stages and the gain through the DC multiplier stage and the AC/DC gain stage as a function of the Vcontrol/Vcontrol (Max) ratio as it goes from 0.1 to 1.0 (in mode 2)
Figure 17:
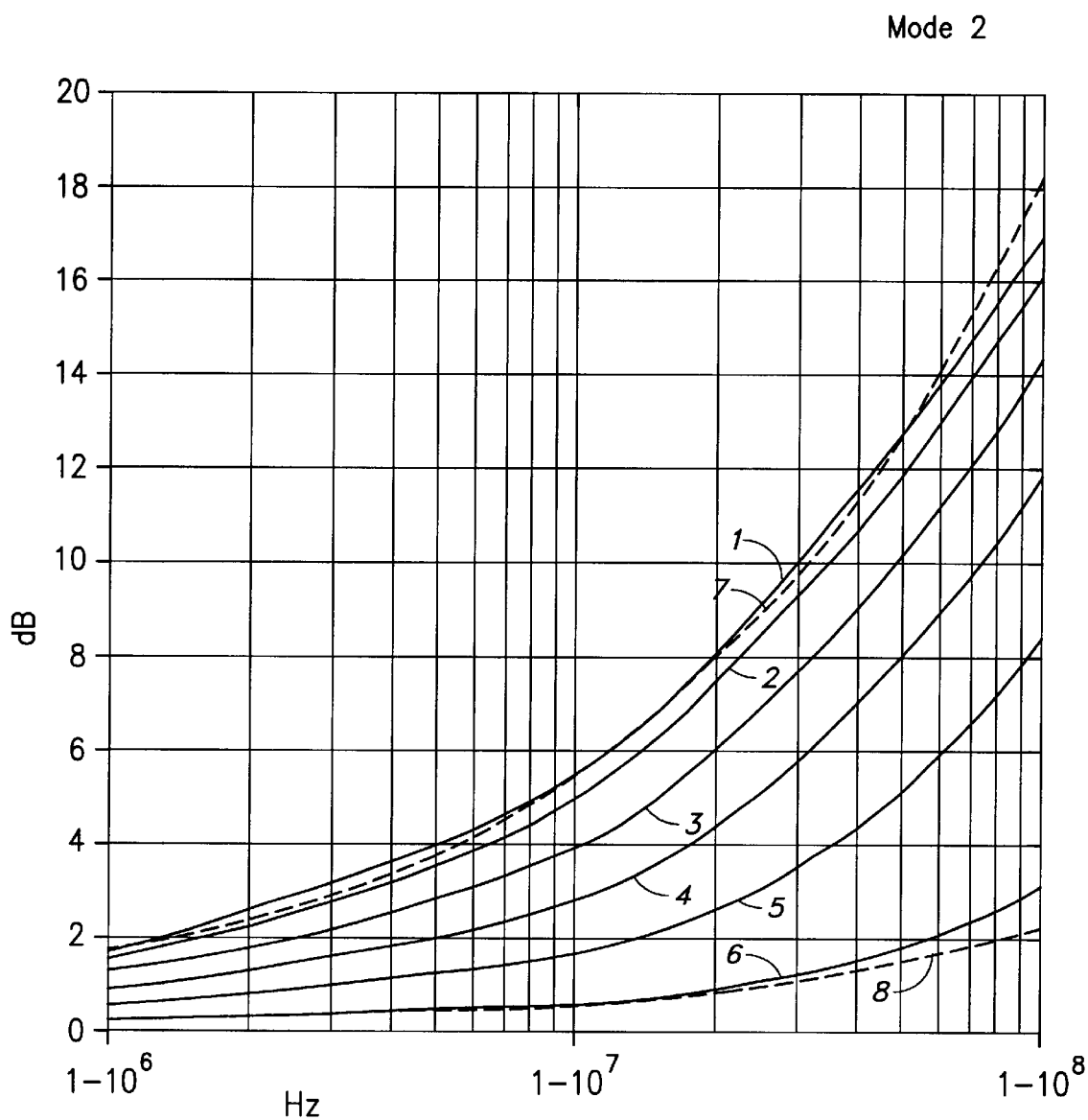
FIG. 17 shows a plot the summation of the gains of the gain curves from FIG. 16 multiplied by 7.6 db for several values of the Vcontrol/Vcontrol(Max) ratio and the cable attenuation curves for cable lengths of 10 meters and 85 meters (in mode 2)
Figure 18:
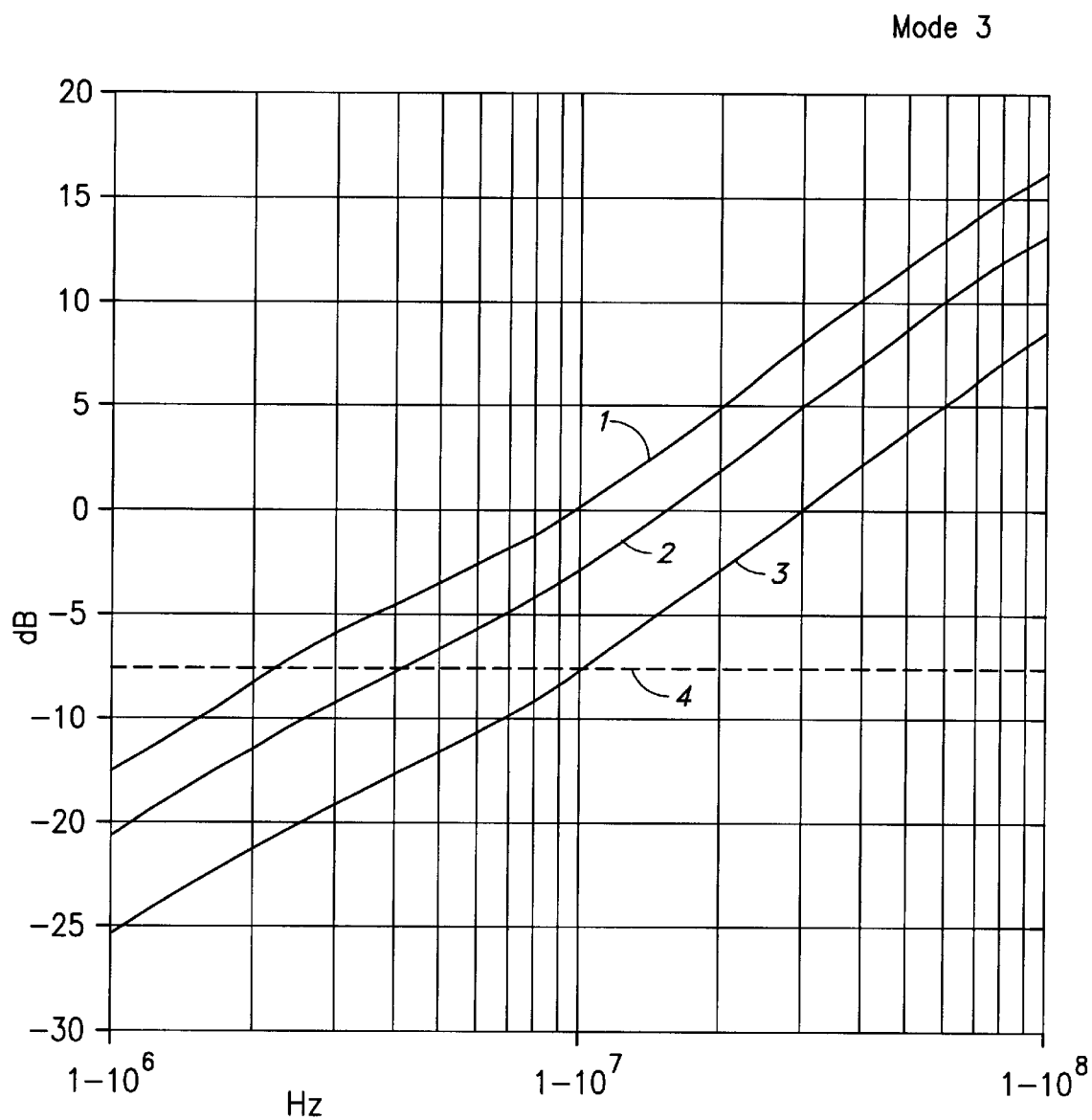
FIG. 18 shows the gain through first and second DC gain stages and the gain through the DC multiplier stage and the AC/DC gain stage as a function of the Vcontrol/Vcontrol (Max) ratio as it goes from 0.4 to 1.0 (in mode 3)
Figure 19:
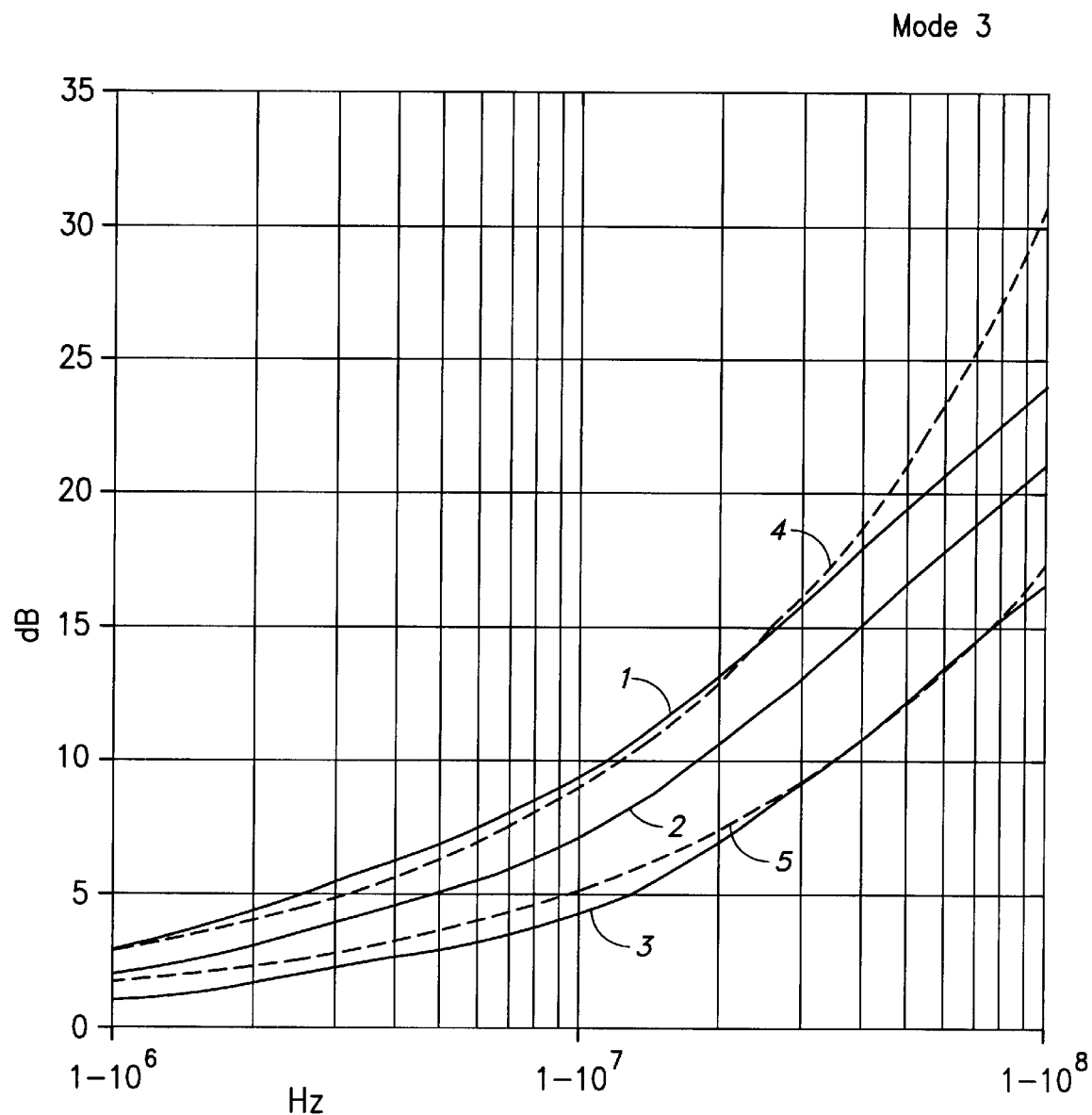
FIG. 19 shows the summation of the gains of the gain curves from FIG. 18 multiplied by 7.6 db for several values of the Vcontrol/Vcontrol(Max) ratio and the cable attenuation curves for 80 meters and 140 meters (in mode 3)

FIG. 15 is a plot showing the summation of the gains of the gain curves from FIG. 14 multiplied by 7.6 db for several values of ratio (, and the cable attenuation curves for 9 meter and 75 meter length cables. In the FIG. 15 plot curves 1–6 represent the gain of the DC multiplier stage multiplied by the gain of the AC/DC gain stage summed with the gain of the DC gain stage 1 multiplied by the gain of the DC gain stage 2, then multiplied by 7.6 db for different values of ((1.0, 0.9, 0.7, 0.3 and 0.1). Curves 7 and 8 are the inverse of the cable attenuation losses for 75 meter and 9 meter UTP cables, respectively.

The plot illustrates that by varying Vcontrol it is possible to match the gain curve to compensate for both DC and AC loss in the various cables.

Adaptive equalization system 150 (FIG. 1) initially starts in mode 1, which is a power up training mode whose outcome determines whether adaptive equalization system 150 operates permanently in a short or long cable mode. Vcontrol initially starts at zero, and the equalization linear channel 310 output waveform 335 carried by signal eqoutp on line 330 is sent to waveform analyzer stage 350. If adaptive equalization system 150 determines that the proper equalization has not been reached and that more AC and DC gain is required, then the output of equalizer DAC 410 (FIG. 1) will be increased and thus Vcontrol will be increased. As Vcontrol is increased a different AC and DC gain, determined by the output of DC multiplier stage 120 multiplied by AC/DC gain stage 125, will be summed with the DC gain determined by the output of first DC gain stage 130 multiplied by second DC gain stage 115. When adaptive equalization system 150 determines that the proper equalization has been reached, the value of Vcontrol will stay within a small voltage window. In mode 1, for cables somewhat longer than 70 meters, adaptive equalization system 150 will not be able to properly equalize the incoming waveform even when maximum gain has been introduced with α=1.

If adaptive equalization system 150 is able to properly equalize in mode 1, then it will move to mode 2, which is similar to mode 1 in that it has Filter Select on line 415 and Boost Select on line 409 both low. However, since Gain Attenuator 411 is a low, the gain of DC multiplier stage 120 is 20*Log(1.4*(Vcontrol/Vcontrol(Max))) and therefore adaptive equalization system 150 will be able to equalize for cables up to 90 meters long. Mode 2 is the short cable non-training mode of operation. By having less gain capabilities in mode 1 than in mode 2, if the adaptive equalization goes to mode 2 there is a guaranteed 15% additional gain to account for system environmental changes which might affect the boost requirements for a given cable length.

If adaptive equalization system 150 is not able to properly equalize in mode 1, then it will move to mode 3 which is the long cable setting with the Filter Select signal on line 415=1. Mode 3 is used for cables which are longer than 80 meters and shorter than 140 meters. Since mode 3 is a long cable setting, it is not necessary to have Vcontrol start at 0. If in mode 3, adaptive equalization system 150 approaches close to the maximum value of Vcontrol, Vcontrol is approximately Vcontrol(Max), then adaptive equalization system 150 puts equalization linear channel 310 in mode 4. Mode 4 is used for cables which are longer than 140 meters. Mode 4 is similar to mode 3 in that Filter Select is 1. However, Boost Select in now 1 and as a result an additional 2 pole/zero high pass filter embedded in the gain buffer 135 is activated which additionally boosts higher frequency components. Typically, this additional boost is that required to approximately recover the AC frequency attenuation for a category five twisted pair cable 20 meters long. By multiplying the summed gain at Vsump and Vsumn by the gain of gain buffer 135, equalization linear channel 310 has sufficient high frequency boost to equalize signals attenuated by up to 170 meters of category five twisted pair cable.

Figure 20:
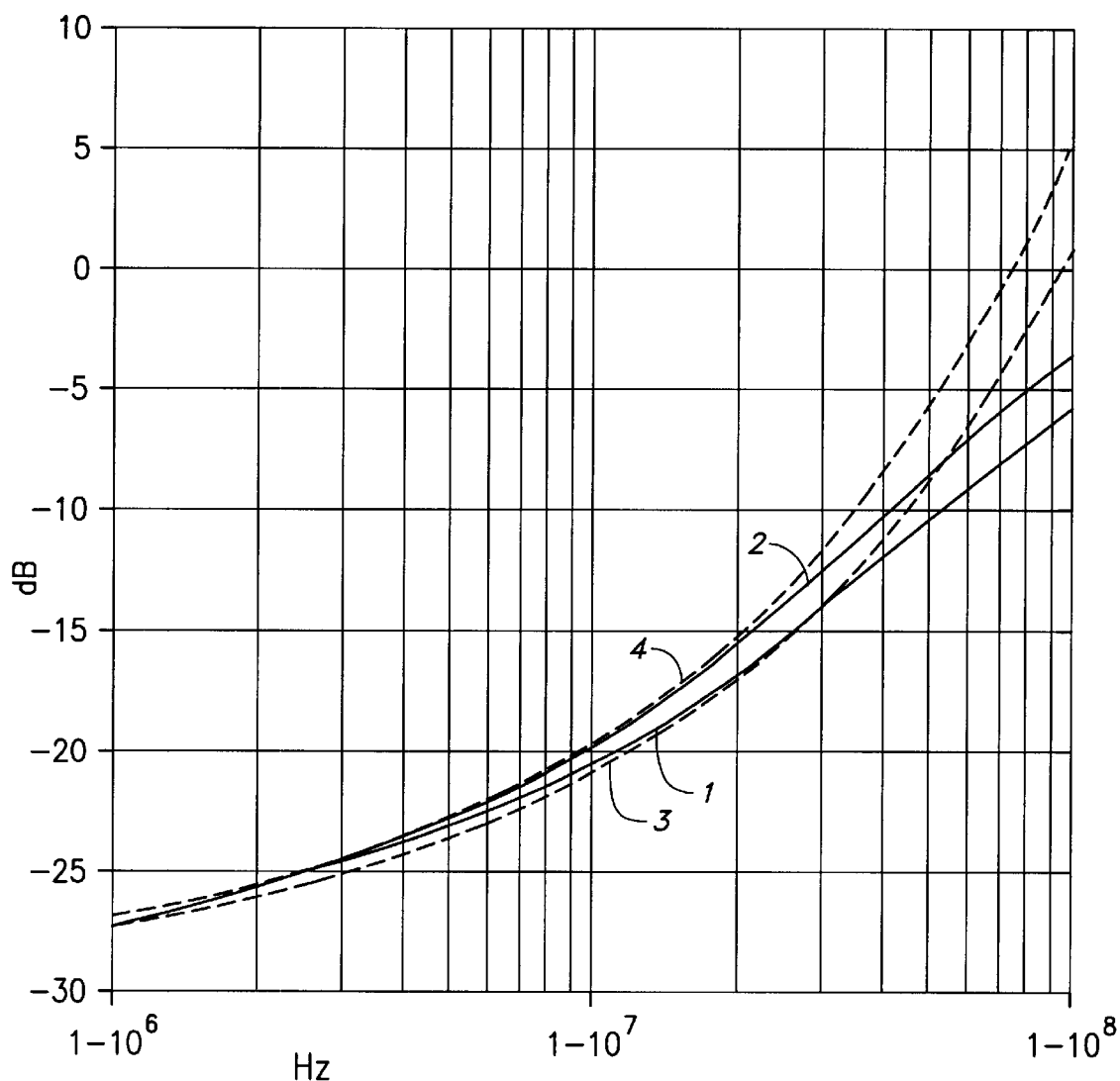
FIG. 20 shows the total gain through equalization linear channel for the maximum value of Vcontrol/Vcontrol (max)=1 for the two cases of boost select 409=0 and boost select 409=1.

FIG. 20 is a plot 2000 which shows the total gain through equalization linear channel 310 for the maximum value of (=1 for the two cases of (1) Boost Select 409=0 and (2) Boost Select 409=1. It can be seen that there is greater gain with Boost Select 409=1. Also plotted are the inverse of the cable attenuation curves for (3) 140 meters and (4) 160 meters. It can be see that with Boost Select 409=1, equalization linear channel 310 is able to compensate well for the cable attenuation at 160 meters.

While the present invention has been described with reference to a preferred embodiment, those skilled in the art will recognize that various modifications may be made. The invention is limited only by the following claims.

We claim:

1. A circuit for equalization of a signal waveform received over a communication system transmission line, comprising:
   an input biasing circuit which provides a common input signal to two parallel amplifier paths;
   one parallel path having a wideband, fixed-gain, frequency-independent amplifier stage;
   the other parallel path having a wideband multiplier amplifier stage in series with a wideband amplifier having a switchable frequency-independent gain characteristic combined with an independently switchable set of high pass gain characteristics;
   a wideband gain buffer amplifier stage having a first fixed frequency-independent gain characteristic combined with a switchable high pass frequency response characteristic, wherein said wideband gain buffer stage has an input port to which an output port of the wideband, fixed-gain frequency-independent amplifier stage is tied in common with an output port of the wideband amplifier stage; and
   switches for selecting the frequency characteristics of the wideband amplifier and the wideband gain buffer amplifier to accommodate various predetermined ranges of transmission line lengths.

2. The circuit of claim 1 wherein the wideband, fixed-gain, frequency-independent amplifier includes two wideband amplifier stages, each having a fixed gain characteristic.

3. The circuit of claim 1 wherein the wideband, fixed-gain, frequency-independent amplifier, the wideband multiplier amplifier, the wideband amplifier combined with an independently switched set of high pass gain characteristics having a switchable frequency-independent gain characteristic, and the wideband gain buffer amplifier stage are differential transconductance MOS amplifiers.

4. The circuit of claim 1 wherein the wideband amplifier having a switchable frequency-independent gain characteristic combined with an independent switchable set of high-pass gain characteristics and the wideband gain buffer amplifier stage are differential transconductance MOS-transistor amplifiers having two amplifier legs with switches for selecting and connecting filter components between the two amplifier legs to provide predetermined frequency response characteristics.

5. The circuit of claim 4 wherein the filter components are connected in parallel with frequency independent components to provided predetermined high-pass frequency characteristics.

6. The circuit of claim 4 wherein the two amplifier legs of the differential transconductance MOS amplifiers have only single transconductance MOS transistors as amplifying elements in series with resistive loads.

7. The circuit of claim 6 wherein the single transconductance MOS transistors are N-MOS transistors having resistive loads connected to their respective drains.

8. The circuit of claim 6 wherein the single transconductance MOS transistors are N-MOS transistors having filter components connected between their respective sources.

9. A circuit for equalization of a signal waveform received over a communication system transmission line, comprising:
   an input biasing circuit which provides a common input signal to two parallel amplifier paths;
   one parallel amplifier path having a wideband, fixed-gain, frequency-independent amplifier;
   the other parallel amplifier path having a wideband multiplier amplifier stage in series with a wideband programmable amplifier stage which has a set of discretely selectable frequency-independent gain characteristics combined with a set of discretely selectable high-pass gain characteristics, wherein the summed gain of the wideband programmable amplifier stage is the result of the addition of the selected frequency-independent gain characteristics and high-pass gain characteristic;
   a wideband gain buffer amplifier stage having a fixed frequency-independent gain characteristic combined with a selectable high-pass frequency response characteristic wherein the gain characteristic of the wideband gain buffer amplifier stage in one state is the fixed frequency independent gain characteristic and in a second state is the summation of the fixed frequency gain characteristic and the high-pass gain characteristic; and
   switches for selecting the frequency characteristics of the wideband amplifier and the wideband gain buffer amplifier to accommodate various predetermined ranges of transmission line lengths.

10. The circuit of claim 9 wherein the wideband, fixed-gain, frequency-independent amplifier stage includes two wideband amplifiers, each having a fixed gain characteristic.

11. The circuit of claim 9 wherein the wideband, fixed-gain, frequency-independent amplifier stage, the wideband multiplier amplifier stage, the wideband programmable amplifier stage, and the wideband gain buffer amplifier stage are differential transconductance MOS amplifiers.

12. The circuit of claim 9 wherein the wideband programmable amplifier stage and the wideband gain buffer amplifier stage are differential transconductance MOS-transistor amplifiers having two amplifier legs with switches for selecting and connecting filter components between the two amplifier legs to provide predetermined frequency response characteristics.

13. The circuit of claim 12 wherein the filter components are connected in parallel with frequency independent components to provided predetermined high-pass frequency characteristics.

14. The circuit of claim 12 wherein the amplifier legs of the differential transconductance MOS amplifiers have only single transconductance MOS transistors as amplifying elements in series with resistive loads.

15. The circuit of claim 14 wherein the single transconductance MOS transistors are N-MOS transistors having resistive loads connected to their respective drains.

16. The circuit of claim 14 wherein the single transconductance MOS transistors are N-MOS transistors having filter components connected between their respective drains.

17. A method of equalizing a signal waveform received over a communication system transmission line, comprising the steps of:

providing a common input signal to two parallel amplifier paths;

in one of said parallel amplifier paths, amplifying the common input signal with a wideband, fixed-gain, frequency-independent amplifier stage;

in the other of said parallel amplifier paths, amplifying the common input signal with a wideband multiplier amplifier stage in series with a wideband amplifier having a switchable frequency-independent gain characteristic combined with an independently switchable set of high-pass gain characteristics;

connecting an output port of the wideband, fixed-gain frequency-independent amplifier stage and an output port of the wideband amplifier stage in common to an input port of a wideband gain buffer amplifier stage having a first fixed frequency-independent gain characteristic combined with a switchable high pass frequency response characteristic;

selecting the frequency characteristics of the wideband amplifier and the wideband gain buffer amplifier with switches to accommodate various predetermined ranges of transmission line lengths.

18. The method of claim 17 wherein the step of amplifying signals in the wideband, fixed-gain, frequency-independent amplifier, the wideband multiplier amplifier, the wideband amplifier, and the wideband gain buffer amplifier stage includes the steps of amplifying the signals with differential transconductance MOS amplifiers.

19. The method of claim 17 wherein the steps of amplifying the signals with differential transconductance MOS amplifiers includes the steps of selectively switching filter components between two amplifier legs of respective differential transconductance MOS-transistor amplifiers to provide pre-determined frequency response characteristics.

20. The method of claim 19 including the steps of connecting the filter components in parallel with frequency independent components to provided predetermined high-pass frequency characteristics.

* * * * *